(12) United States Patent
Baek et al.

(10) Patent No.: US 12,376,133 B2
(45) Date of Patent: Jul. 29, 2025

(54) METHOD AND APPARATUS FOR RESOURCE ALLOCATION OF MBS

(71) Applicant: Samsung Electronics Co., Ltd., Suwon-si (KR)

(72) Inventors: Sangkyu Baek, Suwon-si (KR); Anil Agiwal, Suwon-si (KR); Soenghun Kim, Suwon-si (KR); Sungjin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 17/702,149

(22) Filed: Mar. 23, 2022

(65) Prior Publication Data

US 2022/0322293 A1 Oct. 6, 2022

(30) Foreign Application Priority Data

Mar. 30, 2021 (KR) .......................... 10-2021-0041431
Oct. 21, 2021 (KR) .......................... 10-2021-0140990

(51) Int. Cl.
  *H04W 72/30* (2023.01)
  *H04L 1/1812* (2023.01)
  *H04W 72/23* (2023.01)

(52) U.S. Cl.
  CPC ........... *H04W 72/30* (2023.01); *H04L 1/1812* (2013.01); *H04W 72/23* (2023.01)

(58) Field of Classification Search
  CPC . H04L 27/2601; H04L 12/189; H04L 5/0055; H04L 12/1886; H04L 5/0042;
  (Continued)

(56) References Cited

U.S. PATENT DOCUMENTS

2010/0067468 A1* 3/2010 Ho .................. H04L 1/1812
                                                   714/748
2019/0245657 A1* 8/2019 Lee .................. H04W 80/02
(Continued)

FOREIGN PATENT DOCUMENTS

EP        3624498 B1 *  3/2024  .......... H04L 1/1806
KR   10-2021-0115470 A    9/2021
WO      2021/021525 A1    2/2021

OTHER PUBLICATIONS

International Search Report dated Jun. 24, 2022, issued in an International Application No. PCT/KR2022/004037.
(Continued)

*Primary Examiner* — Nathan S Taylor
(74) *Attorney, Agent, or Firm* — Jefferson IP Law, LLP

(57) ABSTRACT

The disclosure relates to a fifth generation (5G) or sixth generation (6G) communication system for supporting a higher data transmission rate. A method performed by a terminal for processing multicast and broadcast service (MBS) data in a wireless communication system is provided. The method includes receiving, from a base station, first downlink control information (DCI) including first resource allocation information based on a first radio network temporary identity (RNTI), receiving, from the base station, second DCI including second resource allocation information based on a second RNTI and in case that a hybrid automatic repeat request (HARQ) process identifier of the first DCI and a HARQ process identifier of the second DCI are identical, determining whether a new data indicator (NDI) of the second DCI is toggled, based on the first RNTI and the second RNTI, wherein, in case that the first RNTI corresponds to a group-radio network temporary identify (G-RNTI) and the second RNTI corresponds to a cell-radio network temporary identify (C-RNTI), whether the NDI of
(Continued)

the second DCI is toggled is determined based on an NDI value of the first DCI and an NDI value of the second DCI.

16 Claims, 14 Drawing Sheets

(58) Field of Classification Search
CPC ..... H04L 61/5069; H04L 5/00; H04L 1/1812; H04L 1/1822; H04L 1/1845; H04L 1/1864; H04L 1/1877; H04L 2001/0093; H04L 1/18; H04L 1/00; H04W 28/0268; H04W 28/10; H04W 76/10; H04W 80/02; H04W 76/12; H04W 28/02; H04W 80/10; H04W 76/20; H04W 4/40; H04W 4/46; H04W 4/44; H04W 40/22; H04W 40/248; H04W 40/24; H04W 4/06; H04W 16/28; H04W 28/04; H04W 28/18; H04W 72/23; H04W 72/30; H04W 72/00; H04W 72/04; B60W 60/001; B60W 60/00; G05D 1/02; G01S 5/14; G01S 5/06
See application file for complete search history.

(56) References Cited

U.S. PATENT DOCUMENTS

| | | | | |
|---|---|---|---|---|
| 2022/0046677 A1* | 2/2022 | Talarico | ............... | H04W 72/23 |
| 2022/0286818 A1* | 9/2022 | Chin | .................... | H04W 24/08 |
| 2022/0312377 A1* | 9/2022 | Takeda | ................. | H04L 1/1822 |
| 2022/0312525 A1* | 9/2022 | Chin | .................... | H04W 28/06 |
| 2022/0322293 A1* | 10/2022 | Baek | ..................... | H04L 1/1812 |
| 2022/0322313 A1* | 10/2022 | Zhang | ................. | H04W 72/23 |
| 2022/0399965 A1* | 12/2022 | Xu | ....................... | H04L 1/1887 |
| 2023/0119212 A1* | 4/2023 | Hao | ...................... | H04W 24/08 |
| | | | | 370/329 |
| 2023/0188948 A1* | 6/2023 | Zhu | ......................... | H04W 4/06 |
| | | | | 370/329 |
| 2023/0209313 A1* | 6/2023 | Chin | ....................... | H04W 4/06 |
| | | | | 370/329 |
| 2023/0224097 A1* | 7/2023 | Kou | ...................... | H04W 72/23 |
| | | | | 370/329 |
| 2023/0247633 A1* | 8/2023 | Liu | ..................... | H04L 27/2605 |
| | | | | 370/329 |
| 2023/0283498 A1* | 9/2023 | Wang | ................. | H04L 12/1863 |
| | | | | 370/312 |
| 2023/0361932 A1* | 11/2023 | Wang | .................... | H04L 5/0055 |
| 2023/0413286 A1* | 12/2023 | Wang | ................. | H04W 72/232 |
| 2024/0187823 A1* | 6/2024 | Shrivastava | .......... | H04W 76/28 |

OTHER PUBLICATIONS

Google Inc., 'Views on group scheduling for NR MBS', R1-2100698, 3GPP TSG RAN WG1 #104e, section 2, Jan. 18, 2021.
Moderator (CMCC), 'Summary#4 on mechanisms to support group scheduling for RRC_Connected UEs for NR MBS', R1-2101875, 3GPP TSG RAN WG1 #104e, section 3.5, Jan. 19, 2021.
3GPP; TSG RAN; E-UTRA; MAC protocol specification, 3GPP TS 36.321 V16.4.0 (Mar. 2021), section 5.3.1, Mar. 29, 2021.
Ericsson, 'Mechanisms to support MBS group scheduling for RRC_Connected UEs', R1-2105914, 3GPP TSG RAN WG1 #105e, sections 2.1.1.2.1-2.1.1.2.3, May 12, 2021.
Samsung, 'On mechanisms to support group scheduling for RRC_Connected UEs', R1-2101234, 3GPP TSG RAN WG1 #104e, section 2, Jan. 19, 2021.
Extended European Search Report dated Nov. 7, 2023, issued in European Patent Application No. 22781471.2.

* cited by examiner

METHOD AND APPARATUS FOR RESOURCE ALLOCATION OF MBS

CROSS-REFERENCE TO RELATED APPLICATION(S)

This application is based on and claims priority under 35 U.S.C. § 119(a) of a Korean patent application number 10-2021-0041431, filed on Mar. 30 2021, in the Korean Intellectual Property Office, and of a Korean application number 10-2021-0140990, filed on Oct. 21, 2021, in the Korean Intellectual Property Office, the disclosure of each of which is incorporated by reference herein in its entirety.

BACKGROUND

1. Field

The disclosure relates to operations of a terminal (user equipment (UE)) and a base station (evolved node B (eNB), gNodeB (gNB)) in a mobile communication system. More particularly, the disclosure relates to a method and an apparatus for resource allocation of a multicast and broadcast service (MBS).

2. Description of Related Art

Fifth generation (5G) mobile communication technologies define broad frequency bands such that high transmission rates and new services are possible, and may be implemented not only in "Sub 6 GHz" bands such as 3.5 GHz, but also in "Above 6 GHz" bands referred to as millimeter wave (mmWave) including 28 GHz and 39 GHz. In addition, it has been considered to implement sixth generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an enhanced communication method. In addition, the disclosure is to provide a method and an apparatus for enhanced MBS communication. In addition, the disclosure is to provide a method and an apparatus for MBS resource allocation for enhanced MBS communication.

Additional aspects will be set forth in part in the description which follows and, in part, will be apparent from the description, or may be learned by practice of the presented embodiments.

In accordance with an aspect of the disclosure, a method performed by a terminal for processing multicast and broadcast service (MBS) data in a wireless communication system is provided. The method includes receiving, from a base station, first downlink control information (DCI) including first resource allocation information based on a first radio network temporary identity (RNTI), receiving, from the base station, second DCI including second resource allocation information based on a second RNTI and in case that a hybrid automatic repeat request (HARQ) process identifier of the first DCI and a HARQ process identifier of the second DCI are identical, determining whether a new data indicator (NDI) of the second DCI is toggled, based on the first RNTI and the second RNTI, and wherein, in case that the first RNTI corresponds to a group-radio network temporary identify (G-RNTI) and the second RNTI corresponds to a cell-radio network temporary identify (C-RNTI), whether the NDI of the second DCI is toggled is determined based on an NDI value of the first DCI and an NDI value of the second DCI.

In accordance with another aspect of the disclosure, a method performed by a base station for processing multicast and broadcast service (MBS) data in a wireless communication system is provided. The method includes transmitting, to a terminal, first downlink control information (DCI) including first resource allocation information based on a first radio network temporary identity (RNTI) and transmitting, to the terminal, second DCI including second resource allocation information based on a second RNTI to the terminal, wherein, in case that a hybrid automatic repeat request (HARQ) process identifier of the first DCI and a HARQ process identifier of the second DCI are identical, whether a new data indicator (NDI) of the second DCI is toggled is determined based on the first RNTI and the second RNTI, and wherein, in case that, the first RNTI corresponds to a group-radio network temporary identify (G-RNTI) and the second RNTI corresponds to a cell-radio network temporary identify (C-RNTI), whether the NDI of the second DCI is toggled is determined based on an NDI value of the first DCI and an NDI value of the second DCI.

In accordance with another aspect of the disclosure, a terminal for processing multicast and broadcast service (MBS) data in a wireless communication system is provided. The terminal includes a transceiver and a controller configured to receive, from a base station via the transceiver, first downlink control information (DCI) including first resource allocation information based on a first radio network temporary identity (RNTI), to receive, from the base station via the transceiver, second DCI including second resource allocation information based on a second RNTI, and in case that a hybrid automatic repeat request (HARQ) process identifier of the first DCI and a HARQ process identifier of the second DCI are identical, to determine whether a new data indicator (NDI) of the second DCI is toggled, based on the first RNTI and the second RNTI, and wherein, in case that the first RNTI corresponds to a group-radio network temporary identify (G-RNTI) and the second RNTI corresponds to a cell-radio network temporary identify (C-RNTI), whether the NDI of the second DCI is toggled is determined based on an NDI value of the first DCI and an NDI value of the second DCI.

In accordance with another aspect of the disclosure, a base station for processing multicast and broadcast service (MBS) data in a wireless communication system is provided. The base station includes a transceiver and a controller configured to transmit, to a terminal via the transceiver, first downlink control information (DCI) including first resource allocation information based on a first radio network temporary identity (RNTI), and to transmit, to the terminal via the transceiver, second DCI including second resource allocation information based on a second RNTI to the terminal, wherein, in case that a hybrid automatic repeat request (HARQ) process identifier of the first DCI and a HARQ process identifier of the second DCI are identical, whether a new data indicator (NDI) of the second DCI is toggled is determined based on the first RNTI and the second RNTI, and wherein, in case that, the first RNTI corresponds to a group-radio network temporary identify (G-RNTI) and the second RNTI corresponds to a cell-radio network temporary identify (C-RNTI), whether the NDI of the second DCI is toggled is determined based on an NDI value of the first DCI and an NDI value of the second DCI.

The technical subjects pursued in embodiments of the disclosure may not be limited to the above mentioned technical subjects, and other technical subjects which are not mentioned may be clearly understood, through the following descriptions, by those skilled in the art to which the disclosure pertains.

Various embodiments of the disclosure may provide an enhanced communication method. In addition, various embodiments of the disclosure may provide a method and an apparatus for enhanced MBS communication. In addition, various embodiments of the disclosure may provide a method and an apparatus for MBS resource allocation for enhanced MBS communication.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
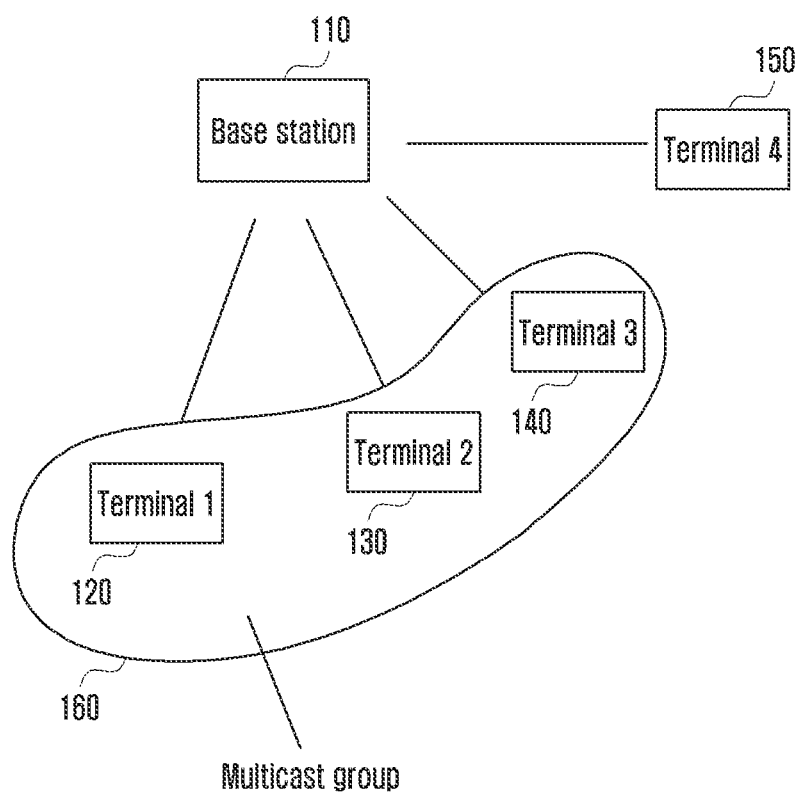
FIG. 1 illustrates an operation scheme of MBS communication according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, description of well-known functions or configurations may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments in the specification, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, may be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card.

FIG. 1 illustrates an operation scheme of MBS communication according to an embodiment of the disclosure.

The MBS communication refers to a scheme in which one transmission device communicates with several reception devices in a wireless communication system. The transmission device may be a base station, and each of the reception devices may be a terminal. However, the disclosure is not limited thereto, and the transmission device may be a terminal.

An embodiment of FIG. 1 illustrates an example of performing MBS communication in case that a base station 110 is a transmission device and terminals 120, 130, and 140 are reception devices. The MBS communication may be performed in a broadcast scheme for unspecified individuals, and may be performed in a multicast scheme for multiple specific reception devices. If the communication is performed in the multicast scheme, reception of a corresponding multicast packet may be configured only for a specific terminal by the base station 110. To this end, a specific set of terminals for performing the multicast communication may be configured, and in the embodiment of FIG. 1, the set is called a multicast group 160. On the other hand, a scheme in which the base station 110 performs one-to-one communication with a terminal 150 is called unicast.

The terminals 120, 130, and 140 in the multicast group may receive allocation of a group-radio network temporary identity (G-RNTI) corresponding to the same resource identifier for each multicast group, and thus receive data allocated to the corresponding G-RNTI. The G-RNTI corresponds to an RNTI shared by terminals in the multicast group, and terminals having received the G-RNTI may receive a radio resource for MBS service, from the base station. In the embodiment of FIG. 1, it is assumed that terminal 1 120, terminal 2 130, and terminal 3 140 are configured as a single multicast group, receive allocation of the G-RNTI, and receive data from the base station 110 in a multicast scheme. Terminal 4 150 is not included in the multicast group, no G-RNTI is allocated to terminal 4, and accordingly, terminal 4 150 cannot receive data received from the base station 110 by terminal 1 120, terminal 2 130, and terminal 3 140.

One or more multicast groups may be configured within the coverage of the base station 110, and the respective multicast groups may be distinguished from each other by G-RNTIs. A terminal may receive allocation of one or more G-RNTIs from the base station 110. The terminal may receive multicast data even in an idle mode (a radio resource control (RRC) idle mode) or an inactive mode (an RRC inactive mode) as well as a connected mode (an RRC connected mode), by using a G-RNTI value allocated in the connected mode. The G-RNTI may be configured to be included in at least one of an RRC reconfiguration message, an RRC setup message, and an RRC reestablishment message in the connected mode of the terminal. However, the G-RNTI is not limited thereto, and the G-RNTI may be included in a system information block (SIB) as a G-RNTI value which may be received by the terminal, and may be transmitted from the base station. The terminal having been configured with the G-RNTI value may apply the G-RNTI value thereafter.

Normally, multicast and broadcast may mean transmission from a transmitter to several receivers in the perspective of service, but in a wireless section, a scheme in which the terminal shares the G-RNTI and the base station transmits the same to multiple terminals is called point-to-multipoint (PTM) transmission. In addition, in the wireless section, a scheme in which the base station transmits data to each terminal through one-to-one communication is called point-to-point (PTP) transmission. Whether to transmit data in the PTM scheme or in the PTP scheme for the multicast or broadcast service may be selected according to an operational situation of a communication network. In addition, the PTM-type transmission and the PTP-type transmission may be interchangeably used. For example, after the base station performs an initial transmission to multiple terminals in the PTM scheme and then may retransmit data in the PTP scheme to a terminal having failed to receive the initial transmission. For the PTM transmission, a G-RNTI corresponding to an RNTI shared by terminals may be used, and for the PTP-type transmission or retransmission, a cell-RNTI (C-RNTI) corresponding to a terminal-specific RNTI or a separate RNTI (referred to as a ReTransmission RNTI (RT-RNTI) in the disclosure) for the PTP transmission of the multicast service may be used. The RT-RNTI may be implemented to include, in a DCI field of a resource allocated using the C-RNTI used for the purpose of unicast resource allocation, an indicator indicating PTP transmission. In case that the terminal identifies the indicator indicating the PTP transmission from a DCI message of a PDCCH physical channel allocated using the C-RNTI, the terminal may identify that the indicator is for the PTP transmission (or retransmission) of the multicast message rather than unicast transmission. In case that the just previous transmission corresponds to unicast transmission using the C-RNTI, transmission which is newly performed may be distinguished as transmission of a message different from that in the previous transmission, and may be considered as a new transmission.

Figure 2:
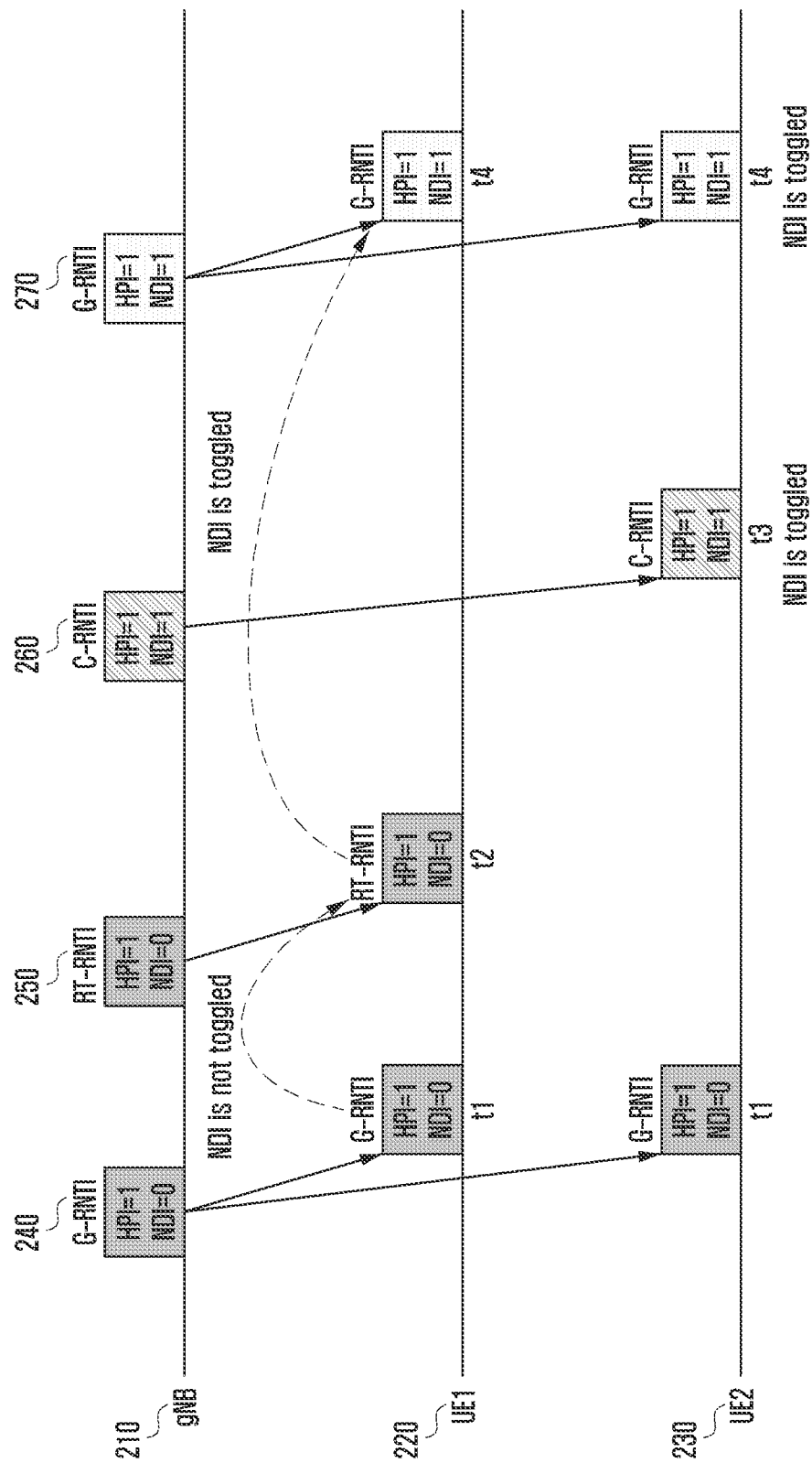
FIG. 2 illustrates a resource allocation scheme for MBS communication according to an embodiment of the disclosure.

FIG. 2 illustrates a resource allocation scheme for MBS communication according to an embodiment of the disclosure.

Referring to FIG. 2, a base station (or gNB) 210 transmits data to a first terminal (user equipment (UE)) 220 and a second terminal 230 by using both PTM-type transmission and PTP-type transmission to provide MBS service. It is assumed in the embodiment of FIG. 2 that the MBS service is provided to two terminals, but the same method may be applied even in a case in which the MBS service is provided to terminals, the number of which is different from two. It is assumed in the embodiment of FIG. 2 that in the PTM-type transmission, a downlink radio resource is allocated and transmitted by using a G-RNTI shared by a terminal, and in the PTP-type transmission, a downlink radio resource is allocated and transmitted, by using an RT-RNTI of each terminal, to the corresponding terminal only. In data transmission of a radio bearer for unicast service, rather than the PTM, a downlink radio resource may be allocated and transmitted to only the corresponding terminal by using a C-RNTI, a modulation coding scheme cell RNTI (MCS-C-RNTI), a configured scheduling RNTI (CS-RNTI), etc.

In case that downlink data transmission is indicated through allocation of a downlink radio resource by using an RNTI, a value of a new data indicator (NDI) bit may be used to indicate whether the transmission is an initial transmission or retransmission. This NDI bit is included in a downlink control info (DCI) message of a physical downlink control channel (PDCCH) physical channel indicating the position of a resource by using each RNTI, and is transmitted. In the embodiment of FIG. 2, in a case of transmission using a G-RNTI and an RT-RNTI, distinguishment between an initial transmission and retransmission is made according to an RNTI used for allocation of the just previously allocated resource and whether an NDI value of the just previous G-RNTI or the RN-RNTI resource has been toggled (switching from 0 to 1 or 1 to 0). The resource allocated by using the G-RNTI or the RT-RNTI may mean PTM or PTP transmission for MBS service, and thus, data of the same HARQ process may be data of the same transport block even though different RNTIs are used for the transmission. However, the resource allocated by using the C-RNTI corresponds to data for unicast rather than transmission for MBS service, and thus, the resource allocated using the C-RNTI is to be positioned subsequent to the resource allocated using the G-RNTI or the RT-RNTI, or in an opposite case, a new initial transmission is to be performed regardless of whether the NDI is toggled. In consideration of the above, in a case of the resource allocated using the G-RNTI or the RT-RNTI, in case that the just previously allocated downlink radio resource in the same HARQ process is allocated using the G-RNTI or the RT-RNTI, determination on whether the transmission is an initial transmission or retransmission is made according to whether a NDI value is toggled, through comparison of NDI values.

Referring to FIG. 2, at time point t1, the base station 210 transmits data of a HARQ process of HARQ process ID 1 to both the first terminal 220 and the second terminal 230 by using the G-RNTI at operation 240. It is assumed that 0 is configured as an NDI value. Thereafter, the base station determines that retransmission is required only for the first terminal 220 and thus performs retransmission in a HARQ process of HARQ process ID 1 to the first terminal 220 at time point t2 by using the RT-RNTI of the first terminal 220, wherein 0 is configured as an NDI value at operation 250. With respect to a downlink radio resource allocated using the RT-RNTI, transmission previously received in the same HARQ process corresponds to a downlink radio resource allocated using the G-RNTI, an thus, the first terminal 220 may compare NDI bit values and determine transmission as retransmission since the NDI bit values are identical to each other with a value of 0, and the NDI bit is not toggled. In a case of the transmission, the first terminal 220 may perform decoding through combining with soft buffer data previously received and stored in a reception HARQ buffer. Thereafter, at time point t3, the base station 210 may perform unicast transmission using the C-RNTI to the second terminal 230 in the HARQ process of the same HARQ process ID 1 at operation 260. Even though the NDI bit value is configured as 1, the previous transmission is MBS data transmission using the G-RNTI, regardless of the NDI bit value, and thus, the second terminal 230 may determine that data transmitted at time point t3 is an initial transmission, wherein the NDI bit is toggled. Thereafter, at time point t4, it is assumed that the base station 210 transmits MBS data in the HARQ process of HARQ process ID 1 to both of the first terminal 220 and the second terminal 230 by using the G-RNTI at operation 270. The NDI bit is configured as 1. Transmission previously received in the same HARQ process corresponds to a downlink radio resource allocated using the RT-RNTI, and thus the first terminal 220 which has identified the allocation of the downlink radio resource may compare NDI bit values and determine, upon the change of the NDI value from 0 to 1, that transmission is an initial transmission, wherein the NDI is toggled. On the other hand, transmission previously received in the same HARQ process corresponds to a downlink radio resource allocated using the C-RNTI, and thus, the second terminal 230 having identified the allocation of the downlink radio resource may determine, upon the assumption that the NDI is toggled, that transmission is an initial transmission, regardless of the NDI bit value.

As described above, the base station 210 may configure, in DCI, an NDI bit for an initial transmission and retransmission data so that the terminals 220 and 230 may perform the operation above, and may perform transmission.

Figure 3:
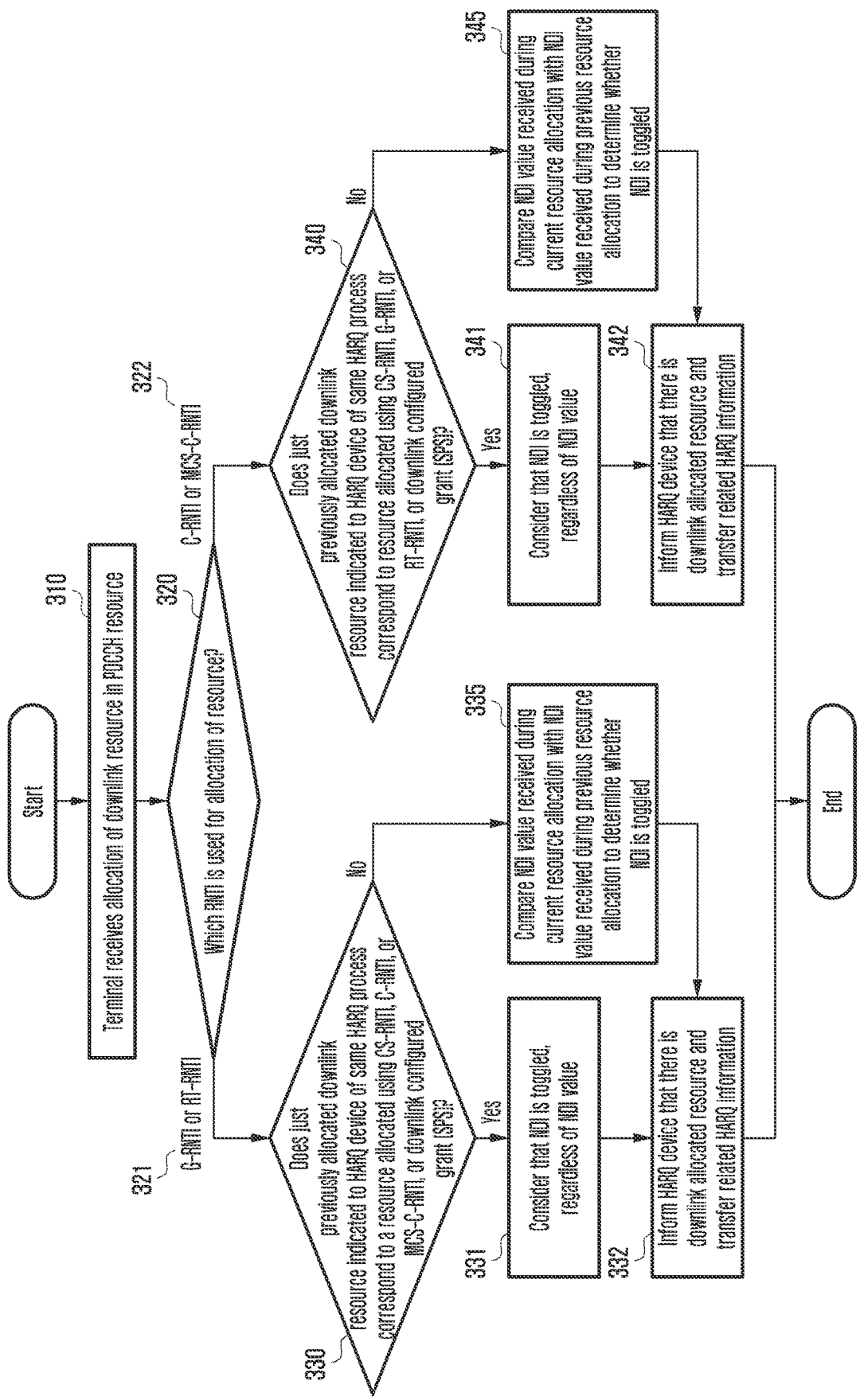
FIG. 3 illustrates a downlink radio resource reception scheme of a terminal for MBS communication according to an embodiment of the disclosure.

FIG. 3 illustrates a downlink radio resource reception scheme of a terminal for MBS communication according to an embodiment of the disclosure.

A base station may transmit data by using both PTM-type transmission and PTP-type transmission to provide MBS service to a terminal.

It is assumed in an embodiment of FIG. 3 that in the PTM-type transmission, a downlink radio resource is allocated and transmitted by using a G-RNTI shared by a terminal, and in the PTP-type transmission, a downlink radio resource is allocated and transmitted, by using an RT-RNTI of each terminal, to the corresponding terminal only. In data transmission of a radio bearer for unicast service, rather than the PTM, a downlink radio resource may be allocated and transmitted to only the corresponding terminal by using a C-RNTI, a modulation coding scheme cell RNTI (MCS-C-RNTI), a configured scheduling RNTI (CS-RNTI), etc. The terminal needs to perform an operation of determining whether downlink transmission from the base station is a new transmission or retransmission.

In case that a downlink radio resource is allocated to the terminal on a PDCCH physical channel at operation 310, the terminal needs to identify an RNTI of the resource, which is used for allocation at operation 320. If the resource corresponds to a resource allocated using a G-RNTI or an RT-RNTI at operation 321, the terminal may identify whether the just previously allocated downlink radio resource indicated to a HARQ device of the same HARQ process corresponds to a resource allocated using a CS-RNTI, a C-RNTI, or an MCS-C-RNTI, or a downlink configured grant (semi-persistent scheduling) at operation 330. In case that a result of the determination in operation 330 shows "yes" (in case that the just previously allocated downlink resource indicated to the HARQ device of the same HARQ process corresponds to the resource allocated using the CS-RNTI, the C-RNTI, or the MCS-C-RNTI, or the downlink configured grant), the previous resource is for unicast transmission, and thus, the just previous transmission does not correspond to the G-RNTI or the RT-RNTI, which are used for MBS data transmission. Accordingly, the terminal may consider that the current transmission according to the PDCCH in operation 310 corresponds to an initial transmission of the MBS transmission, and thus, the NDI is toggled regardless of the NDI value at operation 331. The terminal may inform the HARQ device that there is a downlink allocated resource, and may transfer HARQ information including NDI toggle information at operation 332. In case that a result of the determination in operation 330 shows "no" (in case that the just previously allocated downlink resource indicated to the HARQ device of the same HARQ process does not correspond to the resource allocated using the CS-RNTI, the C-RNTI, or the MCS-C-RNTI, or the downlink configured grant), in other words, in case that the previous resource corresponds to a resource allocated using the G-RNTI or the RT-RNTI at operation 330, whether the NDI is toggled may be determined through comparison between an NDI value of DCI received during current resource allocation with an NDI value received during the previous resource allocation at operation 335.

In case that a downlink radio resource is allocated to the terminal on a PDCCH physical channel at operation 310, the terminal may identify an RNTI of the resource, which is used for allocation at operation 320, and if the resource corresponds to a resource allocated using a C-RNTI or an MCS-C-RNTI at operation 322, the terminal may identify whether the just previously allocated downlink radio resource indicated to a HARQ device of the same HARQ process corresponds to a resource allocated using a CS-RNTI, a G-RNTI, or an RT-RNTI, or a downlink configured grant (semi-persistent scheduling) at operation 340. In case that a result of the determination in operation 340 shows "yes" (in case that the just previously allocated downlink resource indicated to the HARQ device of the same HARQ process corresponds to the resource allocated using the CS-RNTI, the G-RNTI, or the RT-RNTI, or the downlink configured grant), the just previously allocated downlink radio resource is for transmission that is different from the transmission currently allocated using the C-RNTI or MCS-C-RNTI. Accordingly, the terminal may consider that the NDI is toggled regardless of the NDI value at operation 341. The terminal may inform the HARQ device that there is a downlink allocated resource, and may transfer HARQ information including NDI toggle information at operation 342. In case that a result of the determination in operation 340 shows "no" (in case that the just previously allocated downlink resource indicated to the HARQ device of the same HARQ process does not correspond to the resource allocated using the CS-RNTI, the G-RNTI, or the RT-RNTI, or the downlink configured grant), in other words, in case that the previous resource corresponds to a resource allocated using the C-RNTI or the MCS-C-RNTI at operation 340, the terminal may determine whether the NDI is toggled through comparison between an NDI value of DCI received during current resource allocation with an NDI value received during the previous resource allocation at operation 345.

Figure 4:
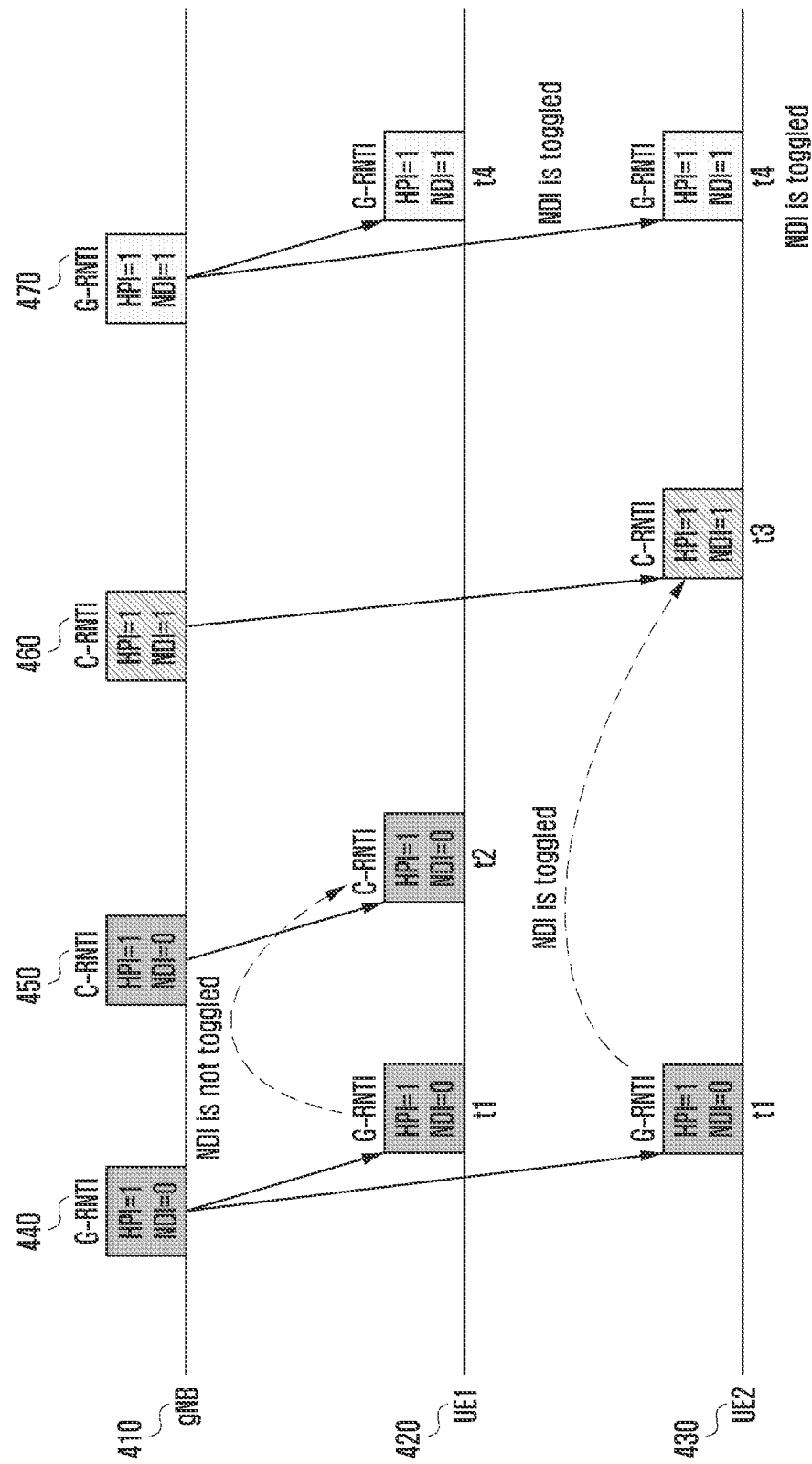
FIG. 4 illustrates a resource allocation scheme for MBS communication according to an embodiment of the disclosure.

FIG. 4 illustrates a resource allocation scheme for MBS communication according to an embodiment of the disclosure.

FIG. 4 indicates that a base station (or gNB) 410 transmits data to a first terminal 420 and a second terminal 430 by using both PTM-type transmission and PTP-type transmission to provide MBS service.

Referring to FIG. 4 that the MBS service is provided to two terminals 420 and 430, but the same method may be applied even in a case in which the MBS service is provided to terminals, the number of which is different from two. It is assumed in the embodiment of FIG. 4 that in the PTM-type transmission, the base station 410 allocates and transmits a downlink radio resource by using a G-RNTI shared by a terminal, and in the PTP-type transmission, the base station 410 allocates and transmits a downlink radio resource to the corresponding terminal only by using a C-RNTI (or an MCS-C-RNTI) that each terminal has for the use of unicast communication. In other words, the transmission using the C-RNTI (or the MCS-C-RNTI) may be used for both PTP-type MBS data transmission and unicast transmission.

In case that downlink data transmission is indicated through allocation of a downlink radio resource by using an RNTI, the base station 410 may use a value of a new data indicator (NDI) bit to indicate whether the transmission is an initial transmission or retransmission. This NDI bit is included in a downlink control info (DCI) message of a physical downlink control channel (PDCCH) physical channel indicating the position of a resource by using each RNTI, and is transmitted. In the embodiment of FIG. 4, in a case of transmission using a G-RNTI, distinguishment between an initial transmission and retransmission is made according to an RNTI used for allocation of the just previously allocated resource and whether an NDI value of the just previous G-RNTI resource has been toggled (switching from 0 to 1 or 1 to 0). The resource allocated by using the G-RNTI may mean PTM transmission for MBS service, and thus, data of the same HARQ process may be data of the same transport block. However, the resource allocated by using the C-RNTI corresponds to data for unicast or PTM transmission for MBS service, and thus, in case that the resource allocated by using the C-RNTI is positioned subsequent to the resource allocated using the G-RNTI, the terminal is to determine whether transmission is the initial transmission, based on whether the NDI is toggled. In an opposite case, in case that the resource allocated by using the G-RNTI is positioned subsequent to the resource allocated by using the C-RNTI (or the MCS-C-RNTI), the terminal is to determine transmission as an initial transmission, regardless of the NDI value. In consideration of the above, in a case of the resource allocated using the G-RNTI, in case that the just previously allocated downlink radio resource in the same HARQ process is allocated using the G-RNTI, the terminal is to determine whether the transmission is an initial transmission or retransmission according to whether a NDI value is toggled, through comparison of NDI values.

Referring to FIG. 4, at time point t1, the base station 410 transmits data of a HARQ process of HARQ process ID 1 to both the first terminal 420 and the second terminal 430 by using the G-RNTI at operation 440. It is assumed that 0 is configured as an NDI value. Thereafter, the base station determines that retransmission is required only for the first terminal 420 and thus performs retransmission of a HARQ process of HARQ process ID 1 to the first terminal 420 at time point t2 by using the C-RNTI of the first terminal 420, wherein 0 is configured as an NDI value at operation 450. With respect to a downlink radio resource allocated using the C-RNTI, transmission previously received in the same HARQ process corresponds to a downlink radio resource allocated using the G-RNTI, an thus, the first terminal 420 may compare NDI bit values and determine transmission as retransmission since the NDI bit values are identical to each other with a value of 0, and the NDI bit is not toggled. In a case of the retransmission, the first terminal 420 may perform decoding through combining with soft buffer data previously received and stored in a reception HARQ buffer. Thereafter, at time point t3, the base station 410 may perform unicast transmission using the C-RNTI to the second terminal 430 in the HARQ process of the same HARQ process ID 1 at operation 460. The transmission previously received in the same HARQ process corresponds to a downlink radio resource allocated by using the G-RNTI, and thus the second terminal 430 may compare NDI bit values and determine, upon the NDI bit value configured with 1, that data transmitted at time point t3 is an initial transmission, wherein the NDI bit is toggled. Thereafter, at time point t4, it is assumed that the base station 410 transmits MBS data in the HARQ process of HARQ process ID 1 to both of the first terminal 420 and the second terminal 430 by using the G-RNTI at operation 470. The NDI bit is configured as 1. Transmission previously received in the same HARQ process corresponds to a downlink radio resource allocated using the C-RNTI, and thus the first terminal 420 which has identified the allocation of the downlink radio resource may determine, upon the assumption that the NDI is toggled, that transmission is an initial transmission, regardless of the NDI bit value. Transmission previously received in the same HARQ process corresponds to a downlink radio resource allocated using the C-RNTI, and thus, the second terminal 430 having identified the allocation of the downlink radio resource may determine, upon the assumption that the NDI is toggled, that transmission is an initial transmission, regardless of the NDI bit value.

As described above, the base station 410 may configure, in DCI, an NDI bit for an initial transmission and retransmission data so that the terminals 420 and 430 may perform the operation above, and may perform transmission.

Figure 5:
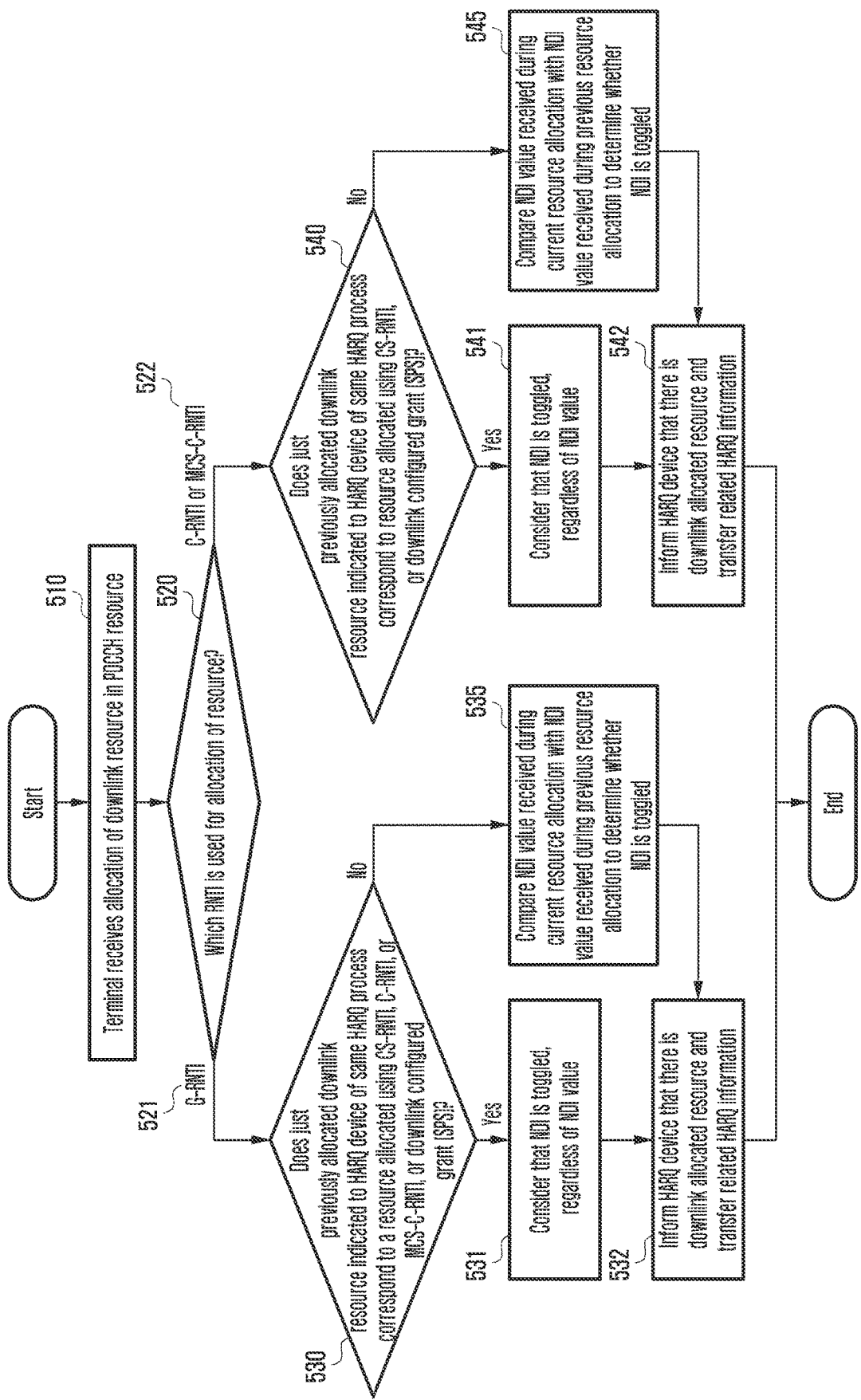
FIG. 5 illustrates a downlink radio resource reception scheme of a terminal for MBS communication according to an embodiment of the disclosure.

FIG. 5 illustrates a downlink radio resource reception scheme of a terminal for MBS communication according to an embodiment of the disclosure.

A base station may transmit data by using both PTM-type transmission and PTP-type transmission to provide MBS service to a terminal.

Referring to FIG. 5 that in the PTM-type transmission, a downlink radio resource is allocated and transmitted by using a G-RNTI shared by a terminal, and in the PTP-type transmission, a downlink radio resource is allocated and transmitted, by using an C-RNTI (or an MCS-C-RNTI) that each terminal has to use for unicast communication, to the corresponding terminal only. In other words, the transmission using the C-RNTI (or the MCS-C-RNTI) may be used for both the PTP-type MBS data transmission and unicast transmission. The terminal needs to perform an operation of determining whether the transmission is a new transmission or retransmission.

In case that a downlink radio resource is allocated to the terminal on a PDCCH physical channel at operation 510, the terminal needs to identify an RNTI of the resource, which is used for allocation at operation 520. If the resource corresponds to a resource allocated using a G-RNTI at operation 521, the terminal may identify whether the just previously allocated downlink radio resource indicated to a HARQ device of the same HARQ process corresponds to a resource allocated using a CS-RNTI, a C-RNTI, or an MCS-C-RNTI, or a downlink configured grant (semi-persistent scheduling) at operation 530. In case that a result of the determination in operation 530 shows "yes" (in case that the just previously allocated downlink resource indicated to the HARQ device of the same HARQ process corresponds to the resource allocated using the CS-RNTI, the C-RNTI, or the MCS-C-RNTI, or the downlink configured grant), the just previous resource is for unicast transmission, and thus, the previous transmission does not correspond to the G-RNTI transmission, which is used for MBS data transmission. Accordingly, the terminal may consider that the current transmission corresponds to an initial transmission, and thus, the terminal may consider that the NDI is toggled, regardless of the NDI value at operation 531. The terminal may inform the HARQ device that there is a downlink allocated resource, and may transfer HARQ information including NDI toggle information at operation 532. In case that a result of the determination in operation 530 shows "no" (in case that the just previously allocated downlink resource indicated to the HARQ device of the same HARQ process does not correspond to the resource allocated using the CS-RNTI, the C-RNTI, or the MCS-C-RNTI, or the downlink configured grant), in other words, in case that the previous resource corresponds to a resource allocated using the G-RNTI at operation 530, the terminal may determine whether the NDI is toggled through comparison between an NDI value of DCI received during current resource allocation with an NDI value received during the previous resource allocation at operation 535.

In case that a downlink radio resource is allocated to the terminal on a PDCCH physical channel at operation 510, the terminal may identify an RNTI of the resource, which is used for allocation at operation 520, and if the resource corresponds to a resource allocated using a C-RNTI or an MCS-C-RNTI at operation 522, the terminal may identify whether the just previously allocated downlink radio resource indicated to a HARQ device of the same HARQ process corresponds to a resource allocated using a CS-RNTI, or a downlink configured grant (semi-persistent scheduling) at operation 540. In case that a result of the determination in operation 540 shows "yes" (in case that the just previously allocated downlink resource indicated to the HARQ device of the same HARQ process corresponds to the resource allocated using the CS-RNTI, or the downlink configured grant), the previously allocated downlink radio resource is for transmission that is different from the transmission currently allocated using the C-RNTI or MCS-C-RNTI. Accordingly, the terminal may consider that the NDI is toggled regardless of the NDI value at operation 541. The terminal may inform the HARQ device that there is a downlink allocated resource, and may transfer HARQ information including NDI toggle information at operation 542. In case that a result of the determination in operation 540 shows "no" (in case that the just previously allocated downlink resource indicated to the HARQ device of the same HARQ process does not correspond to the resource allocated using the CS-RNTI, or the downlink configured grant), in other words, in case that the previous resource corresponds to a resource allocated using the G-RNTI, the C-RNTI, or the MCS-C-RNTI at operation 540, the terminal may determine whether the NDI is toggled through comparison between an NDI value of DCI received during current resource allocation with an NDI value received during the previous resource allocation at operation 545. In the embodiment of FIG. 5, a resource allocated using the C-RNTI or the MCS-C-RNTI may indicate a resource used for unicast or PTP transmission of MBS data.

Figure 6:
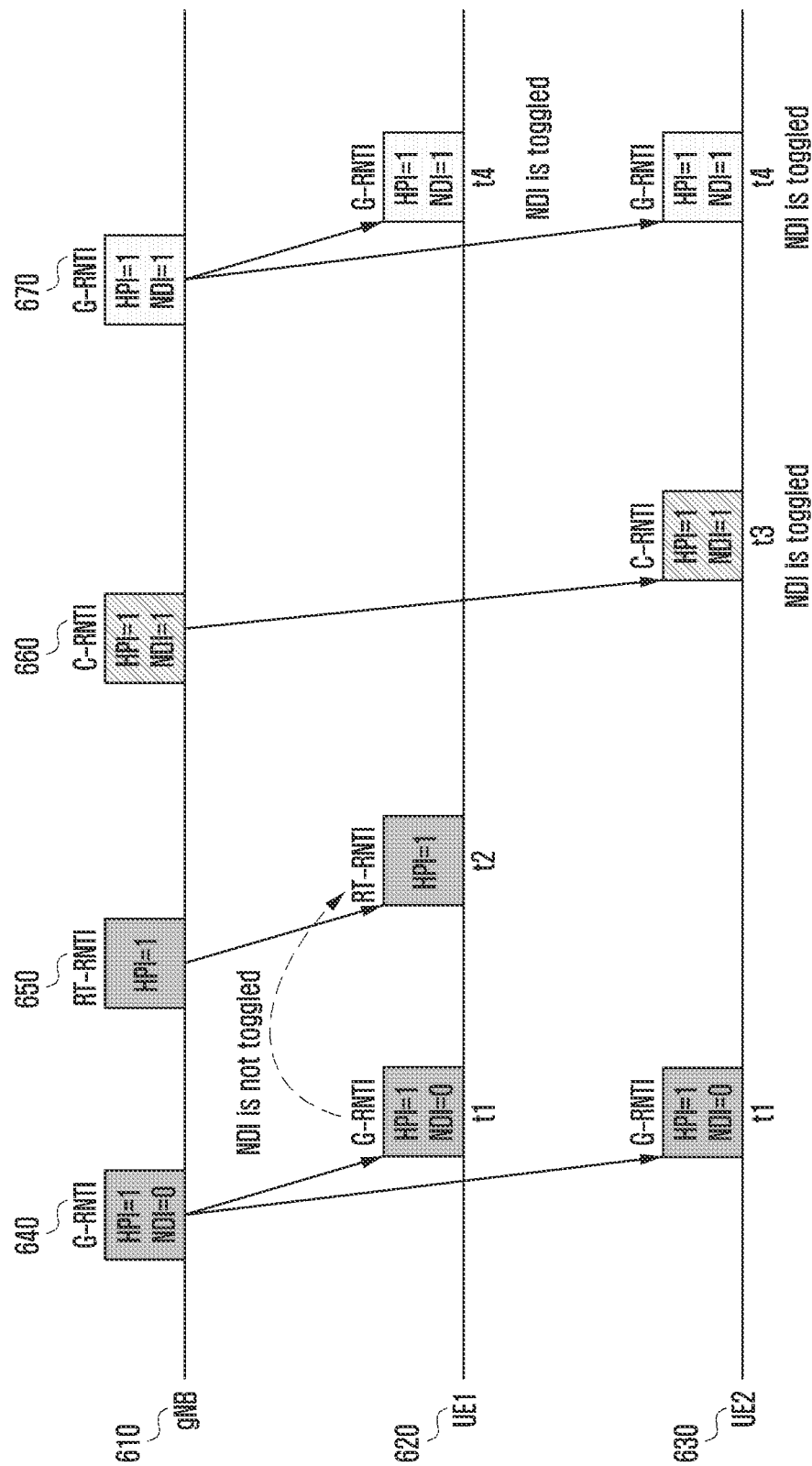
FIG. 6 illustrates a resource allocation scheme for MBS communication according to an embodiment of the disclosure.

FIG. 6 illustrates a resource allocation scheme for MBS communication according to an embodiment of the disclosure.

FIG. 6 indicates that a base station (or gNB) 610 transmits data to a first terminal 620 and a second terminal 630 by using both PTM-type transmission and PTP-type transmission to provide MBS service.

Referring to FIG. 6 that the MBS service is provided to two terminals, but the same method may be applied even in a case in which the MBS service is provided to terminals, the number of which is different from two. It is assumed in the embodiment of FIG. 6 that in the PTM-type transmission, the base station performs an initial transmission or retransmission by allocating a downlink radio resource by using a G-RNTI shared by a terminal, and in the PTP-type transmission, the base station performs retransmission by allocating a downlink radio resource, by using an RT-RNTI of each terminal, to the corresponding terminal only. In data transmission of a radio bearer for unicast service, rather than the PTM, a downlink radio resource may be allocated and transmitted to only the corresponding terminal by using a C-RNTI, a modulation coding scheme cell RNTI (MCS-C-RNTI), a configured scheduling RNTI (CS-RNTI), etc.

In case that downlink data transmission is indicated through allocation of a downlink radio resource by using a specific RNTI, the base station may use a value of a new data indicator (NDI) bit to indicate whether the transmission is an initial transmission or retransmission. This NDI bit is included in a downlink control info (DCI) message of a physical downlink control channel (PDCCH) physical channel indicating the position of a resource by using each RNTI, and is transmitted. In the embodiment of FIG. 6, in a case of transmission using a G-RNTI, distinguishment between an initial transmission and retransmission is made according to an RNTI used for allocation of the just previously allocated resource and whether an NDI value of the just previous G-RNTI resource has been toggled (switching from 0 to 1 or 1 to 0). The resource allocated by using the G-RNTI may mean a PTM initial transmission or retransmission for MBS service, and thus, data of the same HARQ process may be data of the same transport block. The resource allocated by using the RT-RNTI means PTP retransmission for MBS service, and thus, data in the same HARQ process allocated using the previous G-RNTI or the RT-RNTI may be data of the same transport block. However, the resource allocated by using the C-RNTI corresponds to data for unicast, rather than transmission for MBS service, and thus, in case that the resource allocated by using the C-RNTI is positioned subsequent to the resource allocated using the G-RNTI or the RT-RNTI, or in the opposite case, a new initial transmission needs to be performed regardless of whether the NDI is toggled. In consideration of the above, in a case of the resource allocated using the G-RNTI, with respect to the same HARQ process, in case that the just previously allocated downlink radio resource is allocated using the G-RNTI, the terminal may determine whether the transmission is an initial transmission or retransmission according to whether the NDI value is toggled, through comparison of NDI values. In addition, in the embodiment of FIG. 6, it is assumed that the resource allocated using the RT-RNTI is used for PTP retransmission, and thus, in a case where the resource is allocated using the RT-RNTI, in case that a downlink radio resource allocated in the same previously allocated HARQ process corresponds to a resource allocated using the G-RNTI or the RT-RNTI, the downlink radio resource may indicate a retransmission resource regardless of an NDI value. In an embodiment, in case that an NDI value of a resource allocated using the RT-RNTI has a specific value, the resource may mean a retransmission resource regardless of an NDI value of the previous resource. The specific NDI value may be a value of 1.

Referring to FIG. 6, at time point t1, the base station 610 transmits data of a HARQ process of HARQ process ID 1 to both the first terminal 620 and the second terminal 630 by using the G-RNTI at operation 640 It is assumed that 0 is configured as an NDI value. Thereafter, the base station determines that retransmission is required only for the first terminal 620 and thus performs retransmission in a HARQ process of HARQ process ID 1 to the first terminal 620 at time point t2 by using the RT-RNTI of the first terminal 620 at operation 650. The resource allocated using the RT-RNTI corresponds to a retransmission resource, and thus, the first terminal 620 may determine that transmission is retransmission, wherein the NDI is not toggled. In a case of the retransmission, the first terminal 620 may perform decoding through combining with soft buffer data previously received and stored in a reception HARQ buffer. In case that the NDI value is configured with a specific value (e.g., 1), the resource transmitted using the RT-RNTI may mean PTP retransmission. Thereafter, at time point t3, the base station 610 may perform unicast transmission using the C-RNTI to the second terminal 630 in the HARQ process of the same HARQ process ID 1 at operation 660. The NDI value is configured with 1 but the previous transmission corresponds to MBS data transmission using the G-RNTI, regardless of the value, and thus, the second terminal 630 may determine that the data transmitted at time point t3 is an initial transmission, wherein the NDI bit is toggled. Thereafter, at time point t4, it is assumed that the base station 610 transmits MBS data in the HARQ process of HARQ process ID 1 to both of the first terminal 620 and the second terminal 630 by using the G-RNTI at operation 670. The NDI bit is configured as 1. Transmission previously received in the same HARQ process corresponds to a downlink radio resource allocated using the RT-RNTI and the resource corresponds to retransmission of the previous MBS data transmission, and thus the first terminal 620 which has identified the allocation of the downlink radio resource may determine, upon the assumption that the NDI is toggled, that the G-RNTI resource allocated at time point t4 corresponds to an initial transmission. On the other hand, transmission previously received in the same HARQ process corresponds to a downlink radio resource allocated using the C-RNTI, and thus, the second terminal 630 having identified the allocation of the downlink radio resource may determine, upon the assumption that the NDI is toggled, that transmission is an initial transmission, regardless of the NDI bit value.

As described above, the base station may configure, in DCI, an NDI bit for an initial transmission and retransmission data so that the terminals may perform the operation above, and may perform transmission.

Figure 7:
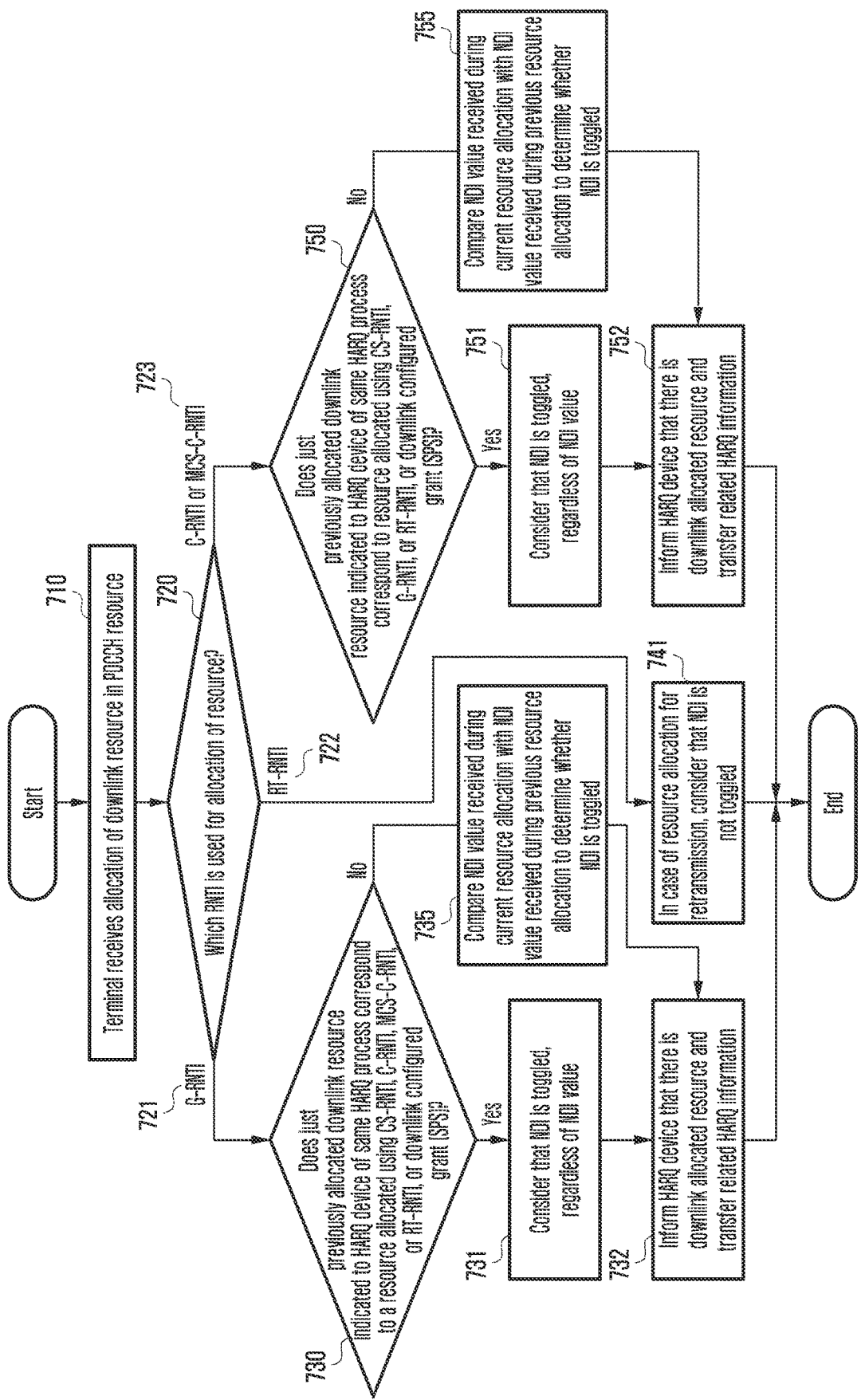
FIG. 7 illustrates a downlink radio resource reception scheme of a terminal for MBS communication according to an embodiment of the disclosure.

FIG. 7 illustrates a downlink radio resource reception scheme of a terminal for MBS communication according to an embodiment of the disclosure.

A base station may transmit data by using both PTM-type transmission and PTP-type transmission to provide MBS service to a terminal.

Referring to FIG. 7 that in the PTM-type transmission, a base station allocates and transmits a downlink radio resource (an initial transmission or retransmission) by using a G-RNTI shared by a terminal, and in the PTP-type transmission, the base station allocates and retransmits a downlink radio resource, by using an RT-RNTI of each terminal, to the corresponding terminal only. In data transmission of a radio bearer for unicast service, rather than the PTM, the base station may allocate and transmit a downlink radio resource to only the corresponding terminal by using a C-RNTI 723, a modulation coding scheme cell RNTI (MCS-C-RNTI), a configured scheduling RNTI (CS-RNTI), etc. The terminal needs to perform an operation of determining whether the transmission is a new transmission or retransmission.

In case that a downlink radio resource is allocated to the terminal on a PDCCH physical channel at operation 710, the terminal needs to identify an RNTI of the resource, which is used for allocation at operation 720. If the resource corresponds to a resource allocated using a G-RNTI at operation 721, the terminal may identify whether the just previously allocated downlink radio resource indicated to a HARQ device of the same HARQ process corresponds to a resource allocated using a CS-RNTI, a C-RNTI, an MCS-C-RNTI, or an RT-RNTI, or a downlink configured grant (semi-persistent scheduling) at operation 730. In case that a result of the determination in operation 730 shows "yes" (in case that the just previously allocated downlink resource indicated to the HARQ device of the same HARQ process corresponds to the resource allocated using the CS-RNTI, the C-RNTI, the MCS-C-RNTI, or the RT-RNTI, or the downlink configured grant), the just previous resource is for unicast transmission or retransmission of the previous MBS data, and thus, the resource currently allocated using the G-RNTI corresponds to an initial transmission of MBS data. Accordingly, the terminal may consider that the NDI is toggled regardless of the NDI value at operation 731. The terminal may inform the HARQ device that there is a downlink allocated resource, and may transfer HARQ information including NDI toggle information at operation 732. In case that a result of the determination in operation 730 shows "no" (in case that the just previously allocated downlink resource indicated to the HARQ device of the same HARQ process does not correspond to the resource allocated using the CS-RNTI, the C-RNTI, the MCS-C-RNTI, or the RT-RNTI, or the downlink configured grant), in other words, in case that the previous resource corresponds to a resource allocated using the G-RNTI at operation 730, the terminal may compare an NDI value of DCI received during current resource allocation with an NDI value received during the previous resource allocation to determine whether the NDI is toggled at operation 735.

In case that a downlink radio resource is allocated to the terminal on a PDCCH physical channel at operation 710, the terminal may identify an RNTI of the resource, which is used for allocation at operation 720, and if the resource corresponds to a resource allocated using an RT-RNTI at operation 722, the resource may correspond to retransmission for MBS data initial transmission previously allocated using the G-RNTI. The resource should be a retransmission resource, and thus, the terminal needs to consider that the NDI bit is not toggled and performs a retransmission procedure at operation 741. In an embodiment, the NDI value of the resource allocated using the RT-RNTI has a specific value, the resource may mean a retransmission resource regardless of the NDI value of the previous resource. This specific NDI value may be a value of 1. However, the resource allocated using the RT-RNTI cannot be an initial transmission resource. With respect to the HARQ process, a first allocated downlink radio resource corresponds to a downlink radio resource allocated using the RT-RNTI, the terminal may ignore the allocation of the resource.

In case that a downlink radio resource is allocated to the terminal on a PDCCH physical channel at operation 710, the terminal may identify an RNTI of the resource, which is used for allocation at operation 720, and if the resource corresponds to a resource allocated using a C-RNTI or an MCS-C-RNTI at operation 722, the terminal may identify whether the just previously allocated downlink radio resource indicated to a HARQ device of the same HARQ process corresponds to a resource allocated using a CS-RNTI, a G-RNTI, or an RT-RNTI, or a downlink configured grant (semi-persistent scheduling) at operation 750. In case that a result of the determination in operation 750 shows "yes" (in case that the just previously allocated downlink resource indicated to the HARQ device of the same HARQ process corresponds to the resource allocated using the CS-RNTI, the G-RNTI, or the RT-RNTI, or the downlink configured grant), the just previously allocated downlink radio resource is for transmission that is different from the transmission currently allocated using the C-RNTI or MCS-C-RNTI. Accordingly, the terminal may consider that the NDI is toggled as intimal transmission regardless of the NDI value at operation 751. The terminal may inform the HARQ device that there is a downlink allocated resource, and may transfer HARQ information including NDI toggle information at operation 752. In case that a result of the determination in operation 750 shows "no" (in case that the just previously allocated downlink resource indicated to the HARQ device of the same HARQ process does not correspond to the resource allocated using the CS-RNTI, the G-RNTI, or the RT-RNTI, or the downlink configured grant), in other words, in case that the previous resource corresponds to a resource allocated using the C-RNTI or the MCS-C-RNTI at operation 750, whether the NDI is toggled may be determined through comparison between an NDI value of DCI received during current resource allocation with an NDI value received during the previous resource allocation at operation 755.

Figure 8:
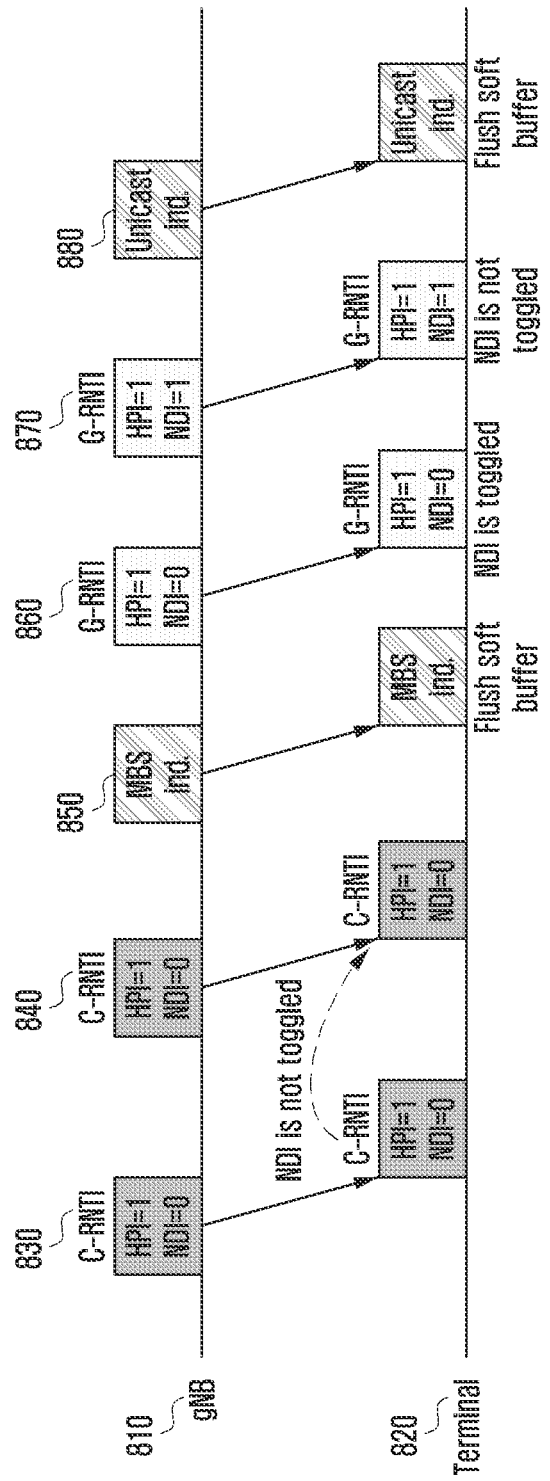
FIG. 8 illustrates a resource allocation scheme for MBS communication according to an embodiment of the disclosure.

FIG. 8 illustrates a resource allocation scheme for MBS communication according to an embodiment of the disclosure.

Referring to FIG. 8, a base station (or gNB) 810 may dynamically change a transmission scheme of a specific HARQ process to provide MBS service to a terminal 820. Specifically, the base station may use the specific HARQ process for unicast transmission and then use the same for PTM or PTP transmission for MBS transmission. To this end, an embodiment of FIG. 8 proposes a method for indicating at operation 850 MBS transmission, or indicating at operation 88) unicast transmission to a terminal by a base station.

Referring to FIG. 8 that the base station 810 first transmits unicast data to the terminal 820. The base station 810 may transmit the unicast data to the terminal 820 by using a C-RNTI (or an MCS-C-RNTI) at operations 830 and 840. The base station 810 and the terminal 820 allocate resources by using the C-RNTI or the MCS-C-RNTI, and the terminal may identify an NDI bit value in a DCI message transmitted on a PDCCH physical channel, determine transmission as an initial transmission in case that the NDI bit is toggled, and determine transmission as retransmission in case that the NDI bit is not toggled. The embodiment of FIG. 8 shows that after the base station 810 performs an initial transmission to the terminal 820 in operation 830, the base station configures the same NDI bit value with 0 and transmits the same in operation 840 to determine the transmission as retransmission, wherein the NDI bit is not toggled.

Thereafter, the base station 810 may transmit an indicator indicating transmission of MBS data to the terminal 820 in order to transmit the MBS data in a PTM or a PTP scheme at operation 850. This indicator indicating the transmission of MBS data may be transmitted through a separate message such as DCI, a medium access control—control element (MAC CE), etc., or may be included in a message during resource allocation for MBS data using a G-RNTI and transmitted to the terminal 820. In an embodiment, resource allocation using the first G-RNTI transmitted to the terminal 820 by the base station 810 after the unicast transmission may replace the indicator indicating the transmission of MBS data. After the transmission of the indicator indicating the transmission of MBS data, the base station 810 may start transmitting data by using the G-RNTI, and the terminal 820 may perform reception of the PTM and PTP data. A MAC PDU of a HARQ buffer stored for the existing unicast transmission may be flushed, so that prevention of combining with the MBS data and decoding later may be performed. That is, the terminal having received the indicator indicating the MBS transmission may flush a HARQ buffer (soft buffer) in the corresponding HARQ process.

After the indicator indicating the transmission of MBS data is transmitted at operation 850, the base station 810 may transmit, to the terminal 820, data allocated using the G-RNTI, and the terminal 820 may receive the data at operation 860. The NDI value is configured with a value of 0 and transmitted, and the configuration of the NDI value with 0 may be an initial transmission of the MBS data. In a case of a downlink radio resource allocated using the G-RNTI, configuration of the NDI value with 1 may correspond to retransmission of the MBS data. According to an embodiment, the base station 810 may perform PTM transmission of the MBS data by using the C-RNTI or the RT-RNTI, wherein the NDI value may be configured with 0 in a case of an initial transmission, and may be configured with 1 in a case of retransmission. The C-RNTI or the RT-RNTI may be used for the PTP retransmission only. In case that the NDI value is configured with 0, it may be considered that the NDI is not toggled as an initial transmission, and in case that the NDI value is configured with 1, it may be considered that the NDI is not toggled as retransmission. It is assumed in the embodiment of FIG. 8 that the base station 810 performs an initial transmission in HARQ process 1 by using the G-RNTI (NDI=0) at operation 860, and then performs PTM retransmission by using the G-RNTI (NDI=1) at operation 870.

While performing the MBS transmission, the base station 810 may transmit the indicator indicating unicast transmission to the terminal 820 in order to perform the unicast transmission at operation 880. The terminal 820 and the base station 810 may use the indicated HARQ process for the unicast transmission using the C-RNTI or the MSC-C-RNTI. A MAC PDU of a HARQ buffer stored for the existing unicast transmission may be flushed, so that prevention of combining with the MBS data and decoding later may be performed. That is, the terminal 820 having received the indicator indicating the unicast transmission may flush a HARQ buffer (soft buffer) of the corresponding HARQ process.

Figure 9:
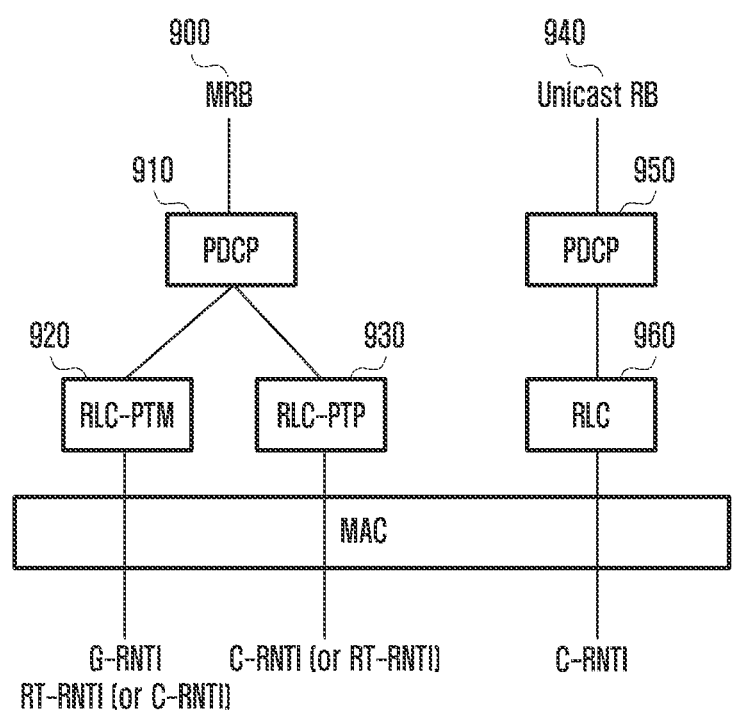
FIG. 9 illustrates a structure of a radio bearer for MBS transmission according to an embodiment of the disclosure.

FIG. 9 illustrates a structure of a radio bearer for MBS transmission according to an embodiment of the disclosure.

A radio bearer for MBS transmission (an MBS radio bearer (MRB)) 900 may correspond to a PDCP device 910. Each PDCP device may have one or more RLC devices, it is assumed in an embodiment of FIG. 9 that the MBS radio bearer (MRB) 900 has two RLC devices 920 and 930. The RLC device may be either a PTM RLC (RLC-PTM) 920 or a PTP RLC (RLC-PTP) 930 according to a transmission scheme. The PTM RLC 920 may mean an RLC device (or a corresponding logical channel) corresponding to a downlink radio resource allocated using a G-RNTI for at least one PTM transmission. The PTM RLC 920 may correspond to not only the G-RNTI for the PTM transmission but also an RNTI for PTP (re)transmission. The RNTI may be an RT-RNTI corresponding to a separate RNTI for PTP retransmission of MBS, or may be a C-RNTI used also in the unicast transmission.

The PTP RLC 930, as an RLC device in charge of the PTP transmission of the MBS data, may correspond to only an RNTI for PTP transmission. The RNTI may be an RT-RNTI corresponding to a separate RNTI for MBS retransmission, or a C-RNTI used also in the unicast transmission.

The terminal may have a unicast radio bearer 940 together with the MBS radio bearer. The unicast radio bearer may be a signaling radio bearer (SRB) or a data radio bearer (DRB). The unicast radio bearer may have one or more RLC devices 960 in one PDCP device 950, wherein the RLC device 960 may mean an RLC device (or a corresponding logical channel) corresponding to a downlink radio resource allocated using the C-RNTI.

Figure 10:
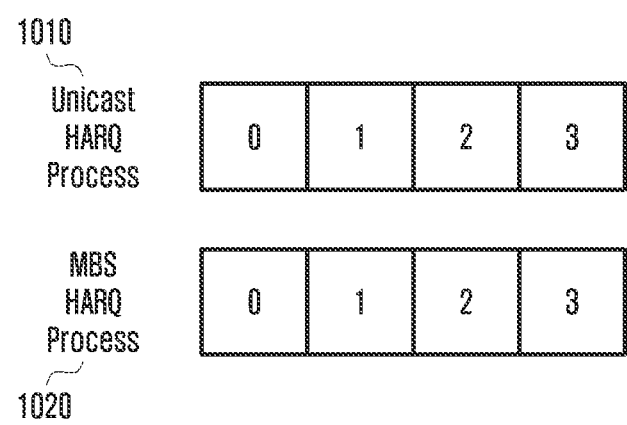
FIG. 10 illustrates a configuration of a hybrid automatic repeat request (HARQ) process for MBS transmission according to an embodiment of the disclosure.

FIG. 10 illustrates a configuration of a HARQ process for MBS transmission according to an embodiment of the disclosure.

A terminal may have several HARQ processes for each cell, and each HARQ process may be in charge of HARQ buffer management during an initial transmission and retransmission. The terminal may have the HARQ processor for MBS transmission, and the HARQ processor for MBS transmission may be separately allocated. However, in an embodiment, some HARQ processes may be allocated for the purpose of MBS, and the base station may configure the number of HARQ processes for MBS transmission. The configuration of the number of HARQ processes for MBS transmission may vary according to time.

Referring to FIG. 10 indicates that there are a total of eight HARQ processes, and four HARQ processes are used for a unicast HARQ process 1010 and an MBS HARQ process 1020. The HARQ process ID may be configured with 0 to 3.

Thereafter, in case that a downlink radio resource is allocated by the G-RNTI, the RT-RNTI, the C-RNTI, the MCS-C-RNTI, etc., distinguishing whether the allocated resource is a unicast HARQ processor or an MBS HARQ process is needed. To this end, in a case of resource allocation using the G-RNTI or the RT-RNTI, the allocated resource may correspond to an MBS HARQ process, and in a case of resource allocation using the C-RNTI or the MCS-C-RNTI, the allocated resource may correspond to a unicast HARQ process. In another embodiment, in a case of resource allocation using the C-RNTI, whether the resource allocation corresponds to resource allocation for a unicast HARQ processor or resource allocation for an MBS HARQ process. Based on this, the terminal may determine a HARQ process.

Figure 11:
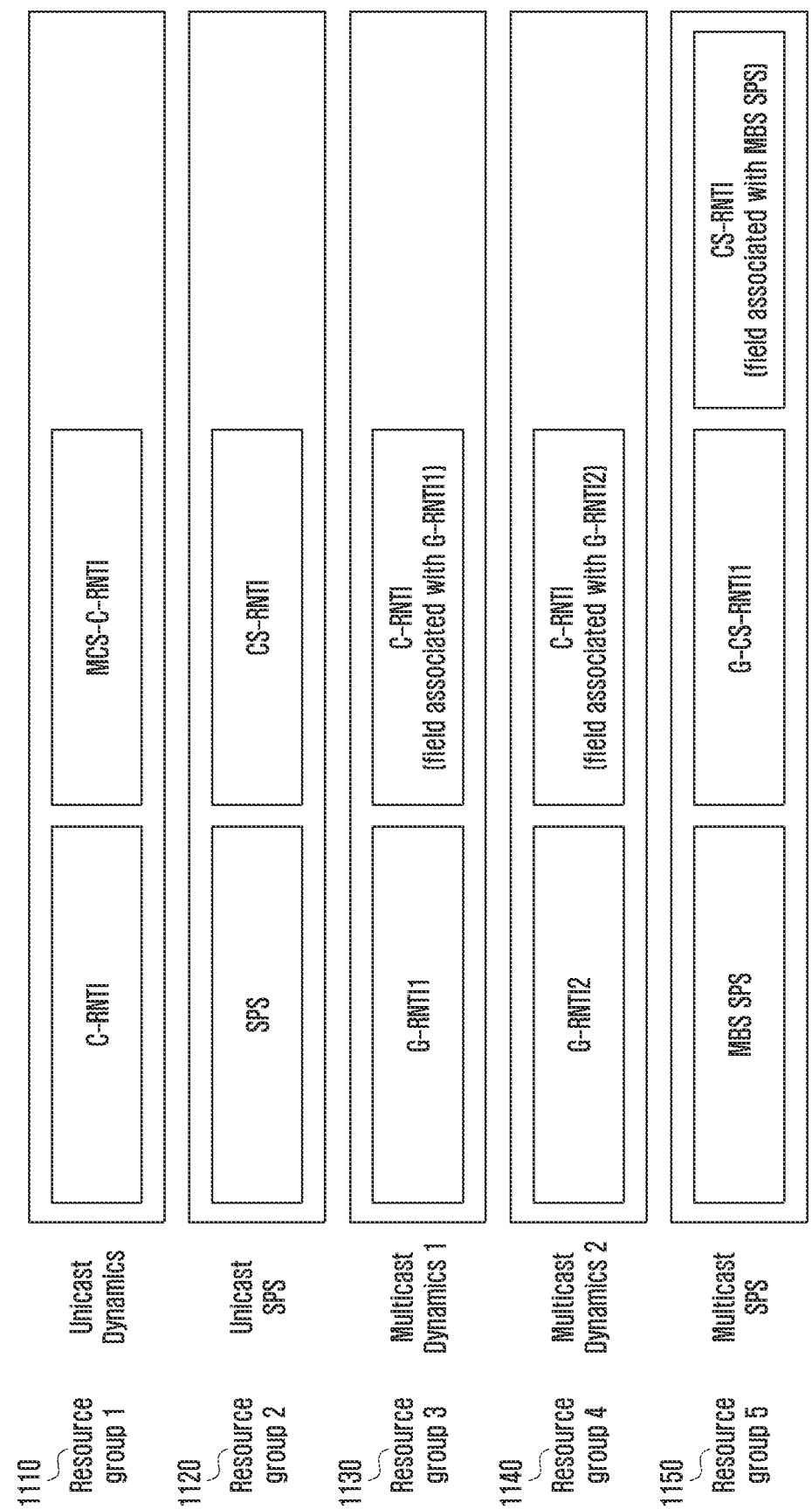
FIG. 11 illustrates a resource allocation group for MBS communication according to an embodiment of the disclosure.

FIG. 11 illustrates a resource allocation group for MBS communication according to an embodiment of the disclosure.

Referring to FIG. 11, according to a method for receiving downlink data by a terminal, a base station may inform the terminal of the position of a downlink resource in the form of a DCI message of a PDCCH by using an RNTI. A scheme of informing of resource transmission on a one-off basis by using the RNTI may be called dynamic allocation (dynamic grant). For a resource of the dynamic allocation, an RNTI such as a C-RNTI, an MCS-C-RNTI, a G-RNTI, a CS-RNTI, and G-CS-RNTI may be used. After the allocation and activation of the resource, semi-persistent scheduling (SPS)-type resource allocation repetitively used for each predetermined cycle until deactivation is indicated is possible. For not only the activation and the deactivation of the SPS resource but also one-off retransmission of the SPS resource that is initially transmitted, a configured scheduling (CS)-RNTI and a group (G)-CS-RNTI may be used. For the dynamic allocation of unicast transmission, a C-RNTI or an MCS-C-RNTI may be used. The retransmission of the dynamic allocation may be also performed in a one-off dynamic allocation scheme, based on a hybrid automatic repeat request (HARQ) feedback of the terminal.

For the dynamic allocation of multicast or broadcast transmission, a G-RNTI may be used. The G-RNTI may be an RNTI shared by multiple terminals in a multicast group, and all terminals having received a G-RNTI may receive PTM-type multicast transmission using the G-RNTI. However, for terminal multicast or broadcast service, whether to transmit data in a PTM scheme or to transmit data in a PTP scheme may be selected according to a communication network management situation. In addition, the PTM-type transmission and the PTP-type re transmission may be interchangeably used. For example, after performing an initial transmission to multiple terminals in the PTM scheme, a base station may retransmit data in the PTP scheme to a terminal which has failed to receive the initial transmission. In order to perform the PTM-type retransmission, a C-RNTI or an MCS-C-RNTI used for unicast transmission may be used to allocate a resource. Multicast or broadcast transmission for which the PTP retransmission (for some terminals, recognized as a PTM initial transmission) is performed needs to be distinguished. To this end, in case that a resource is allocated using a C-RNTI, a DCI message may include an indicator indicating multicast or broadcast service for which the PTM retransmission (for some terminals, recognized as a PTM initial transmission) is performed. Based on the indicator, the terminal may distinguish a G-RNTI or an MBS SPS to which transmission of the resource allocation using the C-RNTI is associated. The multicast or broadcast service may correspond to the G-RNTI or the MBS-SPS one-to-one, one-to-many, many-to-one, or many-to-many, and thus, an indicator used for DCI may correspond to an indicator indicating whether transmission is associated with the G-RNTI or the MBS SPS.

Based on the above, the base station and the terminal may distinguish and determine whether the transmission is associated with data transmission. For the same HARQ process transmission, in a case of transmission with which adjacent transmission (just previous transmission and current transmission) is associated, the terminal may determine whether the recently allocated transmission is a new transmission or retransmission, based on a new data indicator (NDI) included in a DCI message. Specifically, the terminal may determine that the transmission is a new transmission in case that the NDI value is toggled (in case that the NDI value is different from the previous value), and may determine that the transmission is retransmission in case that the NDI value is not toggled (or in case that the NDI value is identical to the previous value). On the other hand, for the same HARQ process transmission, in a case of transmission with which no adjacent transmission (just previous transmission and current transmission) is associated, the terminal may determine that the recently allocated transmission is a new transmission, regardless of the NDI value included in the DCI message. In case that the recently allocated transmission is retransmission, through combining with data stored in the HARQ buffer, a decoding success rate may increase.

An embodiment of FIG. 11 shows a concept of a resource group to recognize transmission with which adjacent transmission (just previous transmission and current transmission) is associated. Resource group 1 1110 in FIG. 11 corresponds to a resource group for unicast transmission using dynamic allocation (dynamic grant) only. In this resource group, there may be a resource (downlink transmission) allocated using a C-RNTI and an MCS-C-RNTI that is not associated with a G-RNTI, MBS SPS, or MBS service. The C-RNTI or MCS-C-RNTI transmission may be used for a unicast initial transmission and retransmission. Resource group 2 1120 of FIG. 11 corresponds to a resource group for unicast transmission using an SPS resource. In this resource group, there may be a resource allocated using unicast SPS and a CS-RNTI used for activation, deactivation, and retransmission of the unicast SPS. The CS-RNTI may mean a CS-RNTI that is not associated with the MBS SPS or the MBS service. Resource group 3 1130 of FIG. 11 corresponds to a resource group for multicast transmission using dynamic allocation only. In this resource group, there may be a resource allocated using one G-RNTI (indicated as a first G-RNTI and there may be multiple G-RNTI allocated to the terminal) and a resource allocated using a C-RNTI that is associated with the first G-RNTI (or associated with MBS service associated with the first G-RNTI). Resource group 4 1140 of FIG. 11 corresponds to a resource group for multicast transmission using dynamic allocation only. In this resource group, there may be a resource allocated using one G-RNTI (indicated as a second G-RNTI, and there may be multiple G-RNTIs allocated to the terminal) and a resource allocated using a C-RNTI that is allocated with the second G-RNTI (or associated with MBS service associated with the second G-RNTI). Specifically, the resource allocation using the first G-RNTI in resource group 3 and the resource allocation using the second RNTI in resource group 4 correspond to resource allocations in different resource groups, and thus, in the same HARQ process, the resource allocated using the changed G-RNTI should be always treated as a new transmission. That is, it should be considered that the NDI value is always toggled. Resource group 5 1150 of FIG. 11 corresponds to a resource group for multicast transmission using an MBS SPS resource. In this resource group, there may be MBS SPS, a resource allocated using a G-CS-RNTI used for activation, deactivation, and retransmission of the MBS SPS in the PTM scheme, and a resource allocated using a CS-RNTI used for activation, deactivation, and retransmission of the MBS SPS in the PTP scheme. The CS-RNTI may mean a CS-RNTI that is not associated with the MBS service of the MBS SPS. It is assumed in the embodiment of FIG. 11 that five types of resource groups are configured, but this may vary according to the number of RNTIs configured for the terminal. However, the MBS SPS or unicast SPS resource is always considered as an initial transmission, and it may be considered that the NDI is toggled. In case that a resource is allocated using the CS-RNTI or the G-CS-RNTI not for the purpose of activation or deactivation, the resource may be considered as a retransmission resource.

Figure 12:
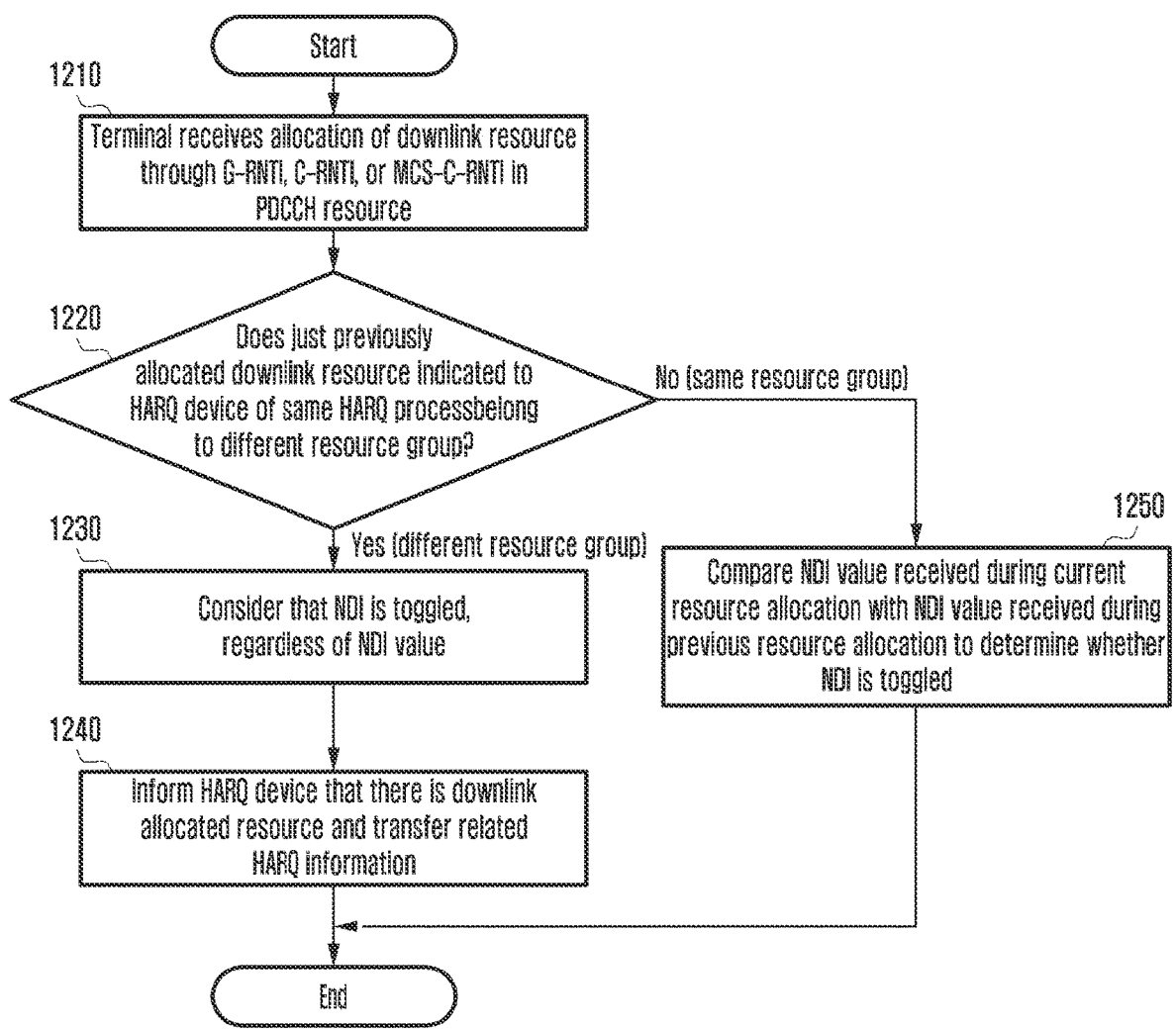
FIG. 12 illustrates a resource allocation scheme for MBS communication according to an embodiment of the disclosure.

FIG. 12 illustrates a resource allocation scheme for MBS communication according to an embodiment of the disclosure.

Referring to FIG. 12, a base station may transmit data to a terminal by using both PTM-type transmission and PTP-type transmission to provide MBS service. It is assumed in an embodiment of FIG. 12 that in the PTM-type transmission, a base station allocates a downlink radio resource in an MBS SPS scheme or by using a G-RNTI or a G-CS-RNTI shared by a terminal and transmits the same (an initial transmission or retransmission), and in the PTP-type retransmission (or transmission), the base station performs retransmission by allocating a downlink radio resource, by using a C-RNTI, an MCS-C-RNTI, or a CS-RNTI of each terminal and by associating a DCI message transmitted through a PDCCH physical channel with MBS service (or with the G-RNTI or the MBS SPS), to the corresponding terminal only. Data transmission of a radio bearer for unicast service may be performed, wherein the base station may allocate a downlink radio resource to the corresponding terminal only by using a C-RNTI, an MCS-C-RNTI, a configured scheduling-RNTI (CS-RNTI), or the like, which is not associated with the MBS service (or not associated with the G-RNTI or the MBS SPS), and may transmit the same. In case that there are mixed resource allocation schemes of several resource groups, the terminal needs to perform an operation of determining whether the transmission is a new transmission or retransmission.

In case that the terminal has received a downlink radio resource by using a G-RNTI, a C-RNTI, or an MCS-RNTI through a PDCCH physical channel at operation 1210, the terminal needs to identify whether the just previously allocated downlink radio resource indicated to a HARQ device of the same HARQ process belongs to a different resource group at operation 1220. Specifically, in case that a resource is allocated using each RNTI, a case of not belonging to the same resource group may be divided into the following examples.

In case that a resource is allocated using the G-RNTI, in at least one of the following cases, a resource is defined to be in a different resource group: (1) a resource allocated using the C-RNTI or the MCS-C-RNTI that is not associated with the G-RNTI (or not associated with the MBS service for the G-RNTI); (2) a resource allocated with another G-RNTI; (3) a resource allocated using the G-CS-RNTI or the CS-RNTI; and (4) a downlink unicast SPS or an MBS SPS resource.

In case that a resource is allocated using the C-RNTI or the MCS-C-RNTI that is not associated with the G-RNTI (or not associated with the MBS service), in at least one of the following cases, a resource is defined to be in a different resource group: (1) a resource allocated using the C-RNTI or the MCS-C-RNTI associated with a certain G-RNTI (or associated with MBS service for a certain G-RNTI); (2) a resource allocated using the G-RNTI; (3) a resource allocated using the G-CS_RNTI or the CS-RNTI; and (4) a downlink unicast SPS or an MBS SPS resource.

In case that a resource is allocated using the C-RNTI or the MCS-C-RNTI associated with the G-RNTI (or associated with the MBS service), in at least one of the following cases, a resource may be defined in a different resource group: (1) a resource allocated using the C-RNTI or the MCS-C-RNTI associated with another G-RNTI (or associated with MBS service for another G-RNTI); (2) a resource allocated using a G-RNTI other than the G-RNTI associated with the C-RNTI or the MCS-C-RNTI; (3) a resource allocated using the G-CS-RNTI or the CS-RNTI; (4) a downlink unicast SPS or an MBS SPS resource; and (5) a resource allocated using the C-RNTI or the MCS-C-RNTI that is not associated with the G-RNTI (or not associated with MBS service for another G-RNTI)

In case that a result of the determination in at operation 1220 shows "yes" (in case that the just previously allocated downlink radio resource indicated to the HARQ device of the same HARQ process does not belong to the same resource group), the just previous resource may be unicast transmission or another MBS data transmission, and thus, the currently allocated resource becomes an initial transmission of data. Accordingly, the terminal may consider that the NDI is toggled, regardless of the NDI value at operation 1230. The terminal may inform the HARQ device that there is a downlink allocated resource, and may transfer HARQ information including NDI toggle information at operation 1240. In case that a result of the determination in operation 1250 shows "no" (in case that the just previously allocated downlink radio resource indicated to the HARQ device of the same HARQ process belongs to the same resource group), the terminal may compare an NDI value of DCI received during the current resource allocation with an NDI value allocated during the previous resource allocation to determine whether the NDI is toggled at operation 1250.

Figure 13:
FIG. 13 illustrates a structure of a base station according to an embodiment of the disclosure.

FIG. 13 illustrates a structure of a base station according to an embodiment of the disclosure.

Referring to FIG. 13, a base station may include a transceiver 1310, a base station controller 1320, and a storage 1330. In the disclosure, the base controller 1320 may be defined as at least one processor or a circuit or application-specific integrated circuit. The base station controller 1320 may be defined as a controller. The transceiver 1310 may transmit or receive a signal to or from other network entities. The transceiver 1310 may transmit, for example, system information to the terminal, and may transmit a synchronous signal or a reference signal. The base station controller 1320 may control an overall operation of the base station according to the embodiment proposed in the disclosure. For example, the base station controller 1320 may control a signal flow between blocks to perform an operation according to the flowchart described above. The storage 1330 may store at least one of information transmitted or received through the transceiver 1310 and information generated through the base station controller 1320.

Figure 14:
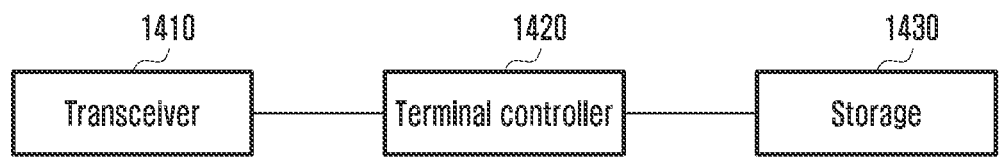
FIG. 14 illustrates a structure of a terminal according to an embodiment of the disclosure.

FIG. 14 illustrates a structure of a terminal according to an embodiment of the disclosure.

Referring to FIG. 14, a terminal may include a transceiver 1410, a terminal controller 1420, and a storage 1430. In the disclosure, the terminal controller 1420 may be defined as at least one processor or a circuit or application-specific integrated circuit. The terminal controller 1420 may be defined as a controller. The transceiver 1410 may transmit or receive a signal to or from other network entities. The transceiver 1410 may receive, for example, system information from the base station, and may receive a synchronous signal or a reference signal. The terminal controller 1420 may control an overall operation of the terminal according to the embodiment proposed in the disclosure. For example, the terminal controller 1420 may control a signal flow between blocks to perform an operation according to the flowchart described above. The storage 1430 may store at least one of information transmitted or received through the transceiver 1410 and information generated through the terminal controller 1420.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents. Further, the above respective embodiments may be employed in combination, as necessary. For example, a part of one embodiment of the disclosure may be combined with a part of any other embodiment to operate a base station and a terminal. In addition, the embodiments of the disclosure may be applied to other communication systems and other variants based on the technical idea of the embodiments may also be implemented.

What is claimed is:

1. A method performed by a terminal in a wireless communication system, the method comprising:
receiving, from a base station, a downlink resource associated with a first radio network temporary identity (RNTI) on a physical downlink control channel (PDCCH);
identifying a type of the first RNTI and a second RNTI associated with a previous downlink resource indicated to a hybrid automatic repeat request (HARQ) entity of a same HARQ process;

identifying whether a new data indicator (NDI) associated with the downlink resource is toggled; and
identifying whether a transmission associated with the downlink resource is a new transmission or a retransmission based on whether the NDI associated with the downlink resource is toggled,
wherein, based on identifying that a type of the first RNTI is a group-radio network temporary identity (G-RNTI) and the second RNTI is a cell-radio network temporary identity (C-RNTI), the NDI is considered as toggled regardless of a value of the NDI,
wherein a presence of the downlink resource is indicated and HARQ information associated with the downlink resource is delivered to the HARQ entity,
wherein, in case that the NDI is toggled, the downlink resource is associated with the new transmission, and
wherein, in case that the NDI is not toggled, the downlink resource is associated with the retransmission.

2. The method of claim 1, wherein, based on identifying that the type of the first RNTI is the G-RNTI and the second RNTI is other G-RNTI, the NDI is considered as toggled regardless of the value of the NDI.

3. The method of claim 1, wherein, based on identifying that the type of the first RNTI is the G-RNTI and the second RNTI is a configured scheduling-radio network temporary identity (CS-RNTI), the NDI is considered as toggled regardless of the value of the NDI.

4. The method of claim 1, wherein, based on identifying that the type of the first RNTI is the C-RNTI and the second RNTI is the G-RNTI, whether the NDI is toggled is identified by comparing the value of the NDI and a value of an NDI associated with the previous downlink resource.

5. A method performed by a base station in a wireless communication system, the method comprising:
transmitting, to a terminal, a first downlink resource associated with a first radio network temporary identity (RNTI) on a physical downlink control channel (PDCCH);
identifying a second RNTI for a second downlink resource; and
transmitting, to the terminal, the second downlink resource associated with the second RNTI on the PDCCH,
wherein, based on identifying that a type of the second RNTI is a group-radio network temporary identity (G-RNTI) and the first downlink resource indicated to a hybrid automatic repeat request (HARQ) entity of a same HARQ process is associated with a cell-radio network temporary identity (C-RNTI), a new data indicator (NDI) associated with the second downlink resource is considered as toggled regardless of a value of the NDI,
wherein a presence of the second downlink resource is indicated and HARQ information associated with the second downlink resource is delivered to the HARQ entity,
wherein, in case that the NDI is toggled, the second downlink resource is associated with a new transmission, and
wherein, in case that the NDI is not toggled, the second downlink resource is associated with a retransmission.

6. The method of claim 5, wherein, based on identifying that the type of the second RNTI is the G-RNTI and the first RNTI is other G-RNTI, the NDI is considered as toggled regardless of the value of the NDI.

7. The method of claim 5, wherein, based on identifying that the type of the second RNTI is the G-RNTI and the first RNTI is a configured scheduling-radio network temporary identity (CS-RNTI), the NDI is considered as toggled regardless of the value of the NDI.

8. The method of claim 5, wherein, based on identifying that the type of the second RNTI is the C-RNTI and the first RNTI is the G-RNTI, whether the NDI is toggled is identified by comparing the value of the NDI and a value of an NDI associated with the first downlink resource.

9. A terminal in a wireless communication system, the terminal comprising:
a transceiver; and
a controller configured to:
receive, from a base station via the transceiver, a downlink resource associated with a first radio network temporary identity (RNTI) on a physical downlink control channel (PDCCH),
identify a type of the first RNTI and a second RNTI associated with a previous downlink resource indicated to a hybrid automatic repeat request (HARQ) entity of a same HARQ process,
identify whether a new data indicator (NDI) associated with the downlink resource is toggled, and
identify whether a transmission associated with the downlink resource is a new transmission or a retransmission based on whether the NDI associated with the downlink resource is toggled,
wherein, based on identifying that a type of the first RNTI is a group-radio network temporary identity (G-RNTI) and the second RNTI is a cell-radio network temporary identity (C-RNTI), the NDI is considered as toggled regardless of a value of the NDI,
wherein a presence of the downlink resource is indicated and HARQ information associated with the downlink resource is delivered to the HARQ entity,
wherein, in case that the NDI is toggled, the downlink resource is associated with the new transmission, and
wherein, in case that the NDI is not toggled, the downlink resource is associated with the retransmission.

10. The terminal of claim 9, wherein, based on identifying that the type of the first RNTI is the G-RNTI and the second RNTI is other G-RNTI, the NDI is considered as toggled regardless of the value of the NDI.

11. The terminal of claim 9, wherein, based on identifying that the type of the first RNTI is the G-RNTI and the second RNTI is a configured scheduling-radio network temporary identity (CS-RNTI), the NDI is considered as toggled regardless of the value of the NDI.

12. The terminal of claim 9, wherein, based on identifying that the type of the first RNTI is the C-RNTI and the second RNTI is the G-RNTI, whether the NDI is toggled is identified by comparing the value of the NDI and a value of an NDI associated with the previous downlink resource.

13. A base station in a wireless communication system, the base station comprising:
a transceiver; and
a controller configured to:
transmit, to a terminal via the transceiver, a first downlink resource associated with a first radio network temporary identity (RNTI) on a physical downlink control channel (PDCCH),
identify a second RNTI for a second downlink resource, and
transmit, to the terminal via the transceiver, the second downlink resource associated with the second RNTI on the PDCCH,
wherein, based on identifying that a type of the second RNTI is a group-radio network temporary identity (G-RNTI) and the first downlink resource indicated to a hybrid automatic repeat request (HARQ) entity of a same HARQ process is associated with a cell-radio network temporary identity (C-RNTI), a new data indicator (NDI) associated with the second downlink resource is considered as toggled regardless of a value of the NDI, wherein a presence of the second downlink resource is indicated and HARQ information associated with the second downlink resource is delivered to the HARQ entity, wherein, in case that the NDI is toggled, the second downlink resource is associated with a new transmission, and wherein, in case that the NDI is not toggled, the second downlink resource is associated with a retransmission.

14. The base station of claim 13, wherein, based on identifying that the type of the second RNTI is the G-RNTI and the first RNTI is other G-RNTI, the NDI is considered as toggled regardless of the value of the NDI.

15. The base station of claim 13, wherein, based on identifying that the type of the second RNTI is the G-RNTI and the first RNTI is a configured scheduling-radio network temporary identity (CS-RNTI), the NDI is considered as toggled regardless of the value of the NDI.

16. The base station of claim 13, wherein, based on identifying that the type of the second RNTI is the C-RNTI and the first RNTI is the G-RNTI, whether the NDI is toggled is identified by comparing the value of the NDI and a value of an NDI associated with the first downlink resource.

\* \* \* \* \*